(12) United States Patent
Konno et al.

(10) Patent No.: US 11,199,504 B2
(45) Date of Patent: Dec. 14, 2021

(54) SHAPE INSPECTION APPARATUS AND SHAPE INSPECTION METHOD

(71) Applicant: NIPPON STEEL CORPORATION, Tokyo (JP)

(72) Inventors: Yusuke Konno, Tokyo (JP); Takayuki Sonoda, Tokyo (JP); Nobuhiro Furuya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/761,416

(22) PCT Filed: Dec. 7, 2018

(86) PCT No.: PCT/JP2018/045168
§ 371 (c)(1),
(2) Date: May 4, 2020

(87) PCT Pub. No.: WO2019/112055
PCT Pub. Date: Jun. 13, 2019

(65) Prior Publication Data
US 2020/0292465 A1 Sep. 17, 2020

(30) Foreign Application Priority Data

Dec. 8, 2017 (JP) .............................. JP2017-236072

(51) Int. Cl.
*G01N 21/892* (2006.01)
*G01B 11/24* (2006.01)
(52) U.S. Cl.
CPC .......... *G01N 21/892* (2013.01); *G01B 11/24* (2013.01)
(58) Field of Classification Search
CPC .......... G01N 21/6428; G01N 15/1404; G01N 21/64; G01N 2201/10; G01N 15/12;
(Continued)

(56) References Cited

U.S. PATENT DOCUMENTS 4,162,126 A * 7/1979 Nakagawa ........... G01N 21/952
250/559.46
4,687,325 A * 8/1987 Corby, Jr. .............. G01B 11/25
356/2

(Continued)

FOREIGN PATENT DOCUMENTS

EP  1 742 041 A1  1/2007
EP  2639545 A1 * 9/2013 ......... G01B 9/02004

(Continued)

OTHER PUBLICATIONS

International Preliminary Report on Patentability and Written Opinion of the International Searching Authority(Forms PCT/IB/326, PCT/IB/373 and PCT/ISA/237), dated Jun. 18, 2020, for International Application No. PCT/JP2018/045168, with an English Translation.

(Continued)

*Primary Examiner* — Michael P Stafira
(74) *Attorney, Agent, or Firm* — Birch, Stewart, Kolasch & Birch, LLP

(57) ABSTRACT

A shape inspection apparatus includes N illumination light sources, a line sensor camera, a measurement control unit, and a data processing unit. The measurement control unit controls the illumination light sources to modulate luminescence intensities at a frequency that is 1/N of a frequency of a scan rate of the line sensor camera, and to emit lights by sequentially repeating N different patterns of illumination intensity ratios. The data processing unit generates a first separated image and a second separated image based on a photographed image, generates a first mixing elimination image acquired by removing an unnecessary illumination component from the first separated image, and a second mixing elimination image acquired by removing an unnecessary illumination component from the second separated image, and calculates an inclination of the surface of the (Continued)

strip-shaped body based on a difference between the first mixing elimination image and the second mixing elimination image.

16 Claims, 20 Drawing Sheets

(58) Field of Classification Search
CPC ......... G01N 15/147; G01N 2015/1409; G01N 2015/1415; G01N 2015/142; G01N 21/1072; G01N 21/645; G01N 21/6452; G01N 21/8806; G01N 21/9501; G01N 21/956; G01N 2201/06113; G01N 2201/0697; G01N 2291/02416; G01N 2219/02809; G01N 2291/02836; G01N 27/447; G01N 29/222; G01N 33/54373; G01N 33/56966; G01N 2021/6439; G01N 21/648; G01N 2201/068; G01N 2201/0683; G01N 2201/12; G01N 15/14; G01N 15/1429; G01N 15/1434; G01N 2021/317; G01N 2021/4797; G01N 2021/6463; G01N 21/359; G01N 21/45; G01N 21/4795; G01N 21/6454; G01N 21/6456; G01N 21/6458; G01N 2201/062; G01N 2201/0696; G01N 2201/08; G01N 2201/0853; G01N 2201/103; G01N 33/56988; G01N 2021/7786; G01N 21/21; G01N 21/7703; G01N 21/8422; G01N 21/88; G01N 21/94; G01N 21/95; G01N 2201/0698; G01N 33/5005; G01N 2021/8909; G01N 2021/8918; G01N 2021/8924; G01N 21/8901; G01N 21/892; G01N 2291/012; G01N 2291/02881; G01N 2291/2623; G01N 29/024; G01N 29/04; G01N 29/14; G01N 29/343; G01N 29/346; G01N 29/348; G01N 29/36; G01J 3/0208; G01J 3/0218; G01J 3/18; G01J 3/2803; G01J 3/36; G01J 1/44; G01J 3/42; G01J 1/0474; G01J 3/108; G01J 3/00; G01J 3/0205; G01J 3/0229; G01J 3/0248; G01J 3/0264; G01J 3/2853; G01J 1/04; G01J 1/0437; G01J 1/047; G01J 2003/064; G01J 3/0202; G01J 3/021; G01J 3/0204; G01J 3/0245; G01J 3/0291; G01J 3/04; G01J 3/06; G01J 3/10; G01J 3/32; G01J 3/502; G02B 6/4226; G02B 21/08; G02B 21/16; G02B 26/0808; G02B 27/48; G02B 21/0056; G02B 21/082; G02B 21/36; G02B 27/283; G02B 27/30; G02B 6/34; G02B 19/0066; G02B 2006/12138; G02B 2027/0123; G02B 2027/0134; G02B 21/00; G02B 21/002; G02B 21/0032; G02B 21/0036; G02B 21/004; G02B 21/006; G02B 21/0076; G02B 21/008; G02B 21/0084; G02B 21/0096; G02B 21/06; G02B 21/14; G02B 21/26; G02B 21/365; G02B 21/367; G02B 2207/123; G02B 23/2407; G02B 23/2469; G02B 26/02; G02B 26/0833; G02B 26/10; G02B 27/0031; G02B 27/017; G02B 27/0905; G02B 27/1013; G02B 27/4227; G02B 27/4244; G02B 27/4277; G02B 30/27; G02B 3/0025; G02B 3/0005; G02B 3/0056; G02B 3/0062; G02B 3/04; G02B 5/045; G02B 5/1828; G02B 5/201; G02B 6/0026; G02B 6/0056; G02B 6/0068; G02B 6/0076; G02B 6/3596; G02B 6/3598; G02B 6/3624; G02B 6/4215; G02B 6/4298; G01B 11/0002; G01B 11/06; G01B 11/24; G01B 21/042; G01B 9/02019; G01B 9/0203; G01B 9/02097; G01B 9/04; G01B 11/022; G01B 11/0675; G01B 11/245; G01B 11/26; G01B 11/30; G01B 2290/45; G01B 2290/70; G01B 9/02002; G01B 9/02003; G01B 9/02007; G01B 9/02012; G01B 9/02041; G01B 9/02087; G01B 9/02094; G01B 9/02098; G01B 11/303; G01B 9/02004; G01B 9/0201; G01B 9/02069; G01B 9/02078; G01B 9/02091

See application file for complete search history.

(56) References Cited

U.S. PATENT DOCUMENTS

| | | | | |
|---|---|---|---|---|
| 5,581,348 | A * | 12/1996 | Miura | G01N 21/94 356/237.2 |
| 5,835,220 | A * | 11/1998 | Kazama | G01J 4/04 356/369 |
| 6,166,393 | A * | 12/2000 | Paul | G01N 21/8806 250/559.08 |
| 6,327,374 | B1 | 12/2001 | Piironen et al. | |
| 6,714,283 | B2 * | 3/2004 | Laurent | G01S 7/487 250/208.1 |
| 6,914,678 | B1 * | 7/2005 | Ulrichsen | B07C 5/342 356/429 |
| 7,202,492 | B2 * | 4/2007 | Inhelder | B65H 23/0216 250/559.4 |
| 7,397,550 | B2 * | 7/2008 | Hackney | G01B 11/2513 257/E21.001 |
| 2010/0007896 | A1 * | 1/2010 | Fishbaine | G01N 21/8806 356/603 |
| 2013/0050470 | A1 * | 2/2013 | Kazama | G01N 21/8914 348/92 |
| 2017/0108443 | A1 * | 4/2017 | Kurihara | G01N 21/8806 |
| 2017/0276543 | A1 * | 9/2017 | Bogaki | H04N 1/02895 |
| 2018/0087898 | A1 | 3/2018 | Akagi et al. | |

FOREIGN PATENT DOCUMENTS

| | | | |
|---|---|---|---|
| EP | 3 179 205 A1 | | 6/2017 |
| JP | 2000111483 A | * | 4/2000 |
| JP | 2001124703 A | * | 5/2001 |
| JP | 2015-129715 A | | 7/2015 |
| JP | 2016091346 A | * | 5/2016 |
| JP | 6040930 B2 | | 12/2016 |
| JP | 2017-9523 A | | 1/2017 |
| WO | WO 2016/194698 A1 | | 12/2016 |

OTHER PUBLICATIONS

International Search Report (Form PCT/ISA/210), dated Jan. 8, 2019, for International Application No. PCT/JP2016/045168, with an English translation.

* cited by examiner

SHAPE INSPECTION APPARATUS AND SHAPE INSPECTION METHOD

TECHNICAL FIELD

The present invention relates to a shape inspection apparatus and a shape inspection method for inspecting a strip-shaped body.

BACKGROUND ART

One of the methods for measuring the surface shape of a measurement object is to use illumination light utilizing a fluorescent lamp, a light emitting diode (LED), a laser beam or the like, and photograph reflection light of the illumination light that is reflected from the measurement object to measure the surface shape of the measurement object.

For example, as a surface defect detection method that optically detects surface defects of a steel material, Patent Document 1 that is mentioned hereunder discloses a surface defect detection method that includes an radiation step of utilizing two or more discriminable light sources to radiate illumination light from different directions at the same inspection target region, and a detection step of acquiring images resulting from reflection light of the respective illumination lights and subjecting the acquired images to differential processing to thereby detect a surface defect in the inspection target region.

LIST OF PRIOR ART DOCUMENTS

Patent Documents

Patent Document 1: JP6040930B

SUMMARY OF INVENTION

Technical Problem

In the method described in the above-described Patent Document 1, images of the reflection light of the illumination light of two or more discriminable light sources are acquired by two area sensors, and a surface defect in an inspection target region is detected by taking the difference between the acquired images. In a case where an inspection target surface is shiny as in a steel material, since the radiation angle of illumination and the visual angle of the surface are different according to regions of a field of view in the photographing by an area sensor, even the same defect will be viewed differently according to the position in the view field, and it is difficult to achieve a uniform detection sensitivity. Further, in order to improve the resolution of measurement, when it is intended to increase the switching speeds of the two or more light sources, switching will be performed before the luminescence intensities of the light sources rise sufficiently, the illumination light of a plurality of light sources will be mixed, and a correct measurement result cannot be obtained.

Therefore, an objective of the present invention, which has been made in consideration of the above problems, is to provide a shape inspection apparatus and a shape inspection method for a strip-shaped body, which are capable of measuring the surface shape of a measurement object with a uniform sensitivity within a field of view, irrespective of whether or not mixing of illumination lights occurs.

Solution to Problem

To solve the aforementioned problems, according to a certain aspect of present invention, there is provided a shape inspection apparatus for detecting a surface shape of a strip-shaped body that includes: N illumination light sources each configured to radiate strip-shaped illumination light to the strip-shaped body; a line sensor camera configured to photograph a surface of the strip-shaped body; a measurement control unit configured to control a lighting timing of each of the illumination light sources and a photographing timing of the line sensor camera; and a data processing unit configured to process a plurality of line images acquired by the line sensor camera, and to calculate an inclination of the surface of the strip-shaped body, wherein: the N illumination light sources include at least a first illumination light source and a second illumination light source, the first illumination light source and the second illumination light source are arranged so that respective optical axes are symmetric about a specular reflection direction at the surface of the strip-shaped body of an optical axis of the line sensor camera, the measurement control unit controls the N illumination light sources to modulate luminescence intensities at a frequency that is 1/N of a frequency of a scan rate of the line sensor camera, and to emit lights by sequentially repeating N different patterns of illumination intensity ratios, including at least a pattern in which lighting of at least a plurality of the illumination light sources is overlapped, and the data processing unit calculates an inclination of the surface of the strip-shaped body based on a second line image acquired with a second pattern in which the second illumination light source emits light.

Further, to solve the aforementioned problems, according to a different aspect of the present invention there is provided a shape inspection method for detecting a surface shape of a strip-shaped body that includes: a radiating step of using N illumination light sources to radiate respective strip-shaped illumination lights to the strip-shaped body; a photographing step of photographing a surface of the strip-shaped body using a line sensor camera; a measurement control step of controlling lighting timings of the illumination light sources, and a photographing timing of the line sensor camera; and a data processing step of processing a line image acquired by the line sensor camera, and calculating an inclination of the surface of the strip-shaped body, the N illumination light sources include at least a first illumination light source and a second illumination light source, the first illumination light source and the second illumination light source are arranged so that respective optical axes are symmetric about a specular reflection direction at the surface of the strip-shaped body of an optical axis of the line sensor camera, the measurement control step includes controlling the N illumination light sources to modulate luminescence intensities at a frequency that is 1/N of a frequency of a scan rate of the line sensor camera, and to emit lights by sequentially repeating N different patterns of illumination intensity ratios, including at least a pattern in which lighting of at least a plurality of the illumination light sources is overlapped, and the data processing step includes calculating an inclination of the surface of the strip-shaped body based on a first line image acquired with a first pattern in which the first illumination light source emits light, and a second line image acquired with a second pattern in which the second illumination light source emits light.

Advantageous Effects of Invention

According to the present invention as described above, it is possible to measure the surface shape of a measurement object with a uniform sensitivity within a field of view, irrespective of whether or not mixing of illumination lights occurs.

DESCRIPTION OF EMBODIMENTS

Hereinafter, preferred embodiments of the present invention will be described in detail with reference to the appended drawings. In the present description and the drawings, elements that have substantially the same function and structure are denoted with the same reference signs, and repeated explanation is omitted.

1. First Embodiment

[1-1. Outline of Shape Inspection Apparatus]

Figure 1:
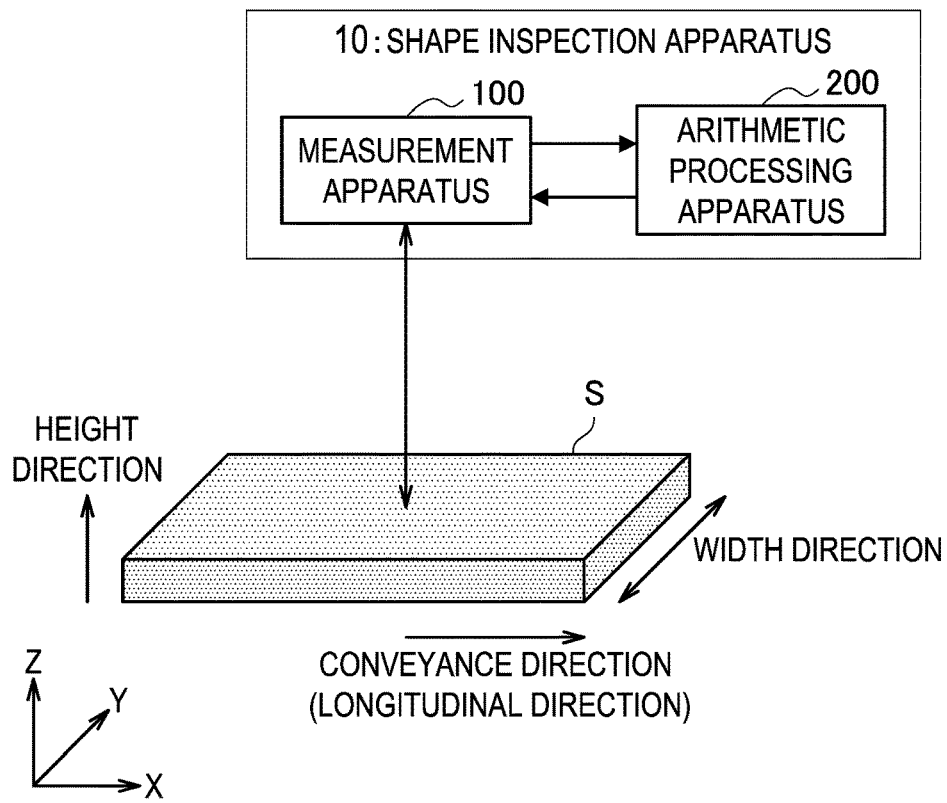
FIG. 1 is an explanatory diagram illustrating one configuration example of a shape inspection apparatus according to a first embodiment of the present invention.
Figure 2:
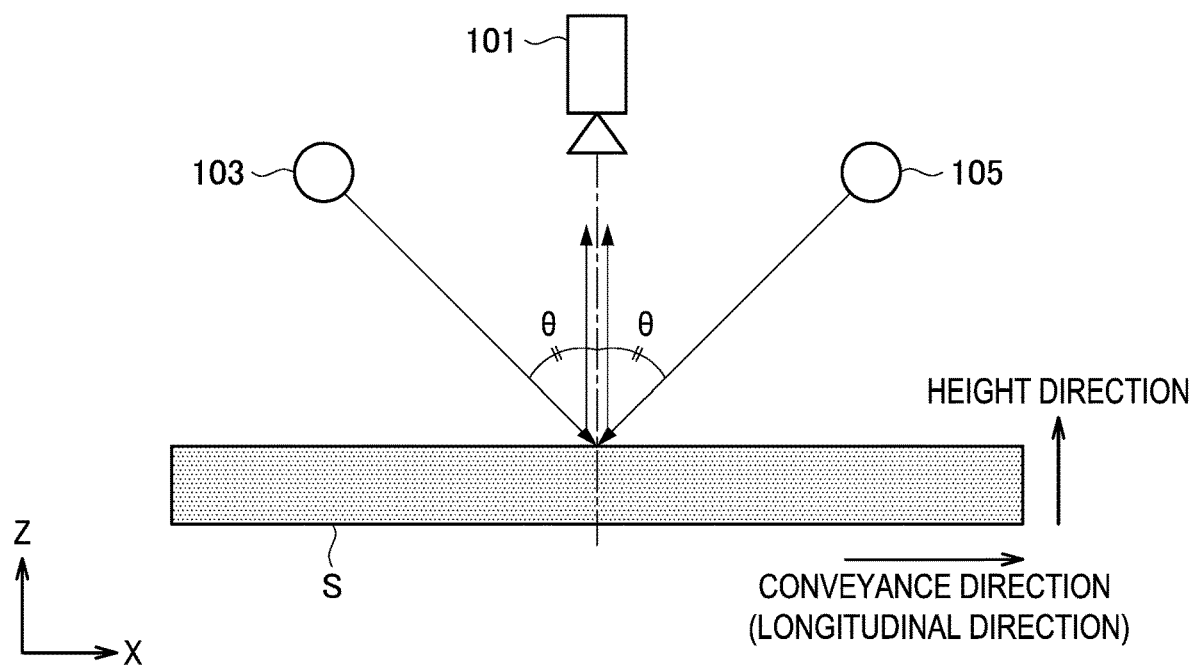
FIG. 2 is an explanatory diagram for describing the intensity of luminance of reflection light of illumination light that is acquired by a line sensor camera at a time when the surface of a strip-shaped body is level.
Figure 3:
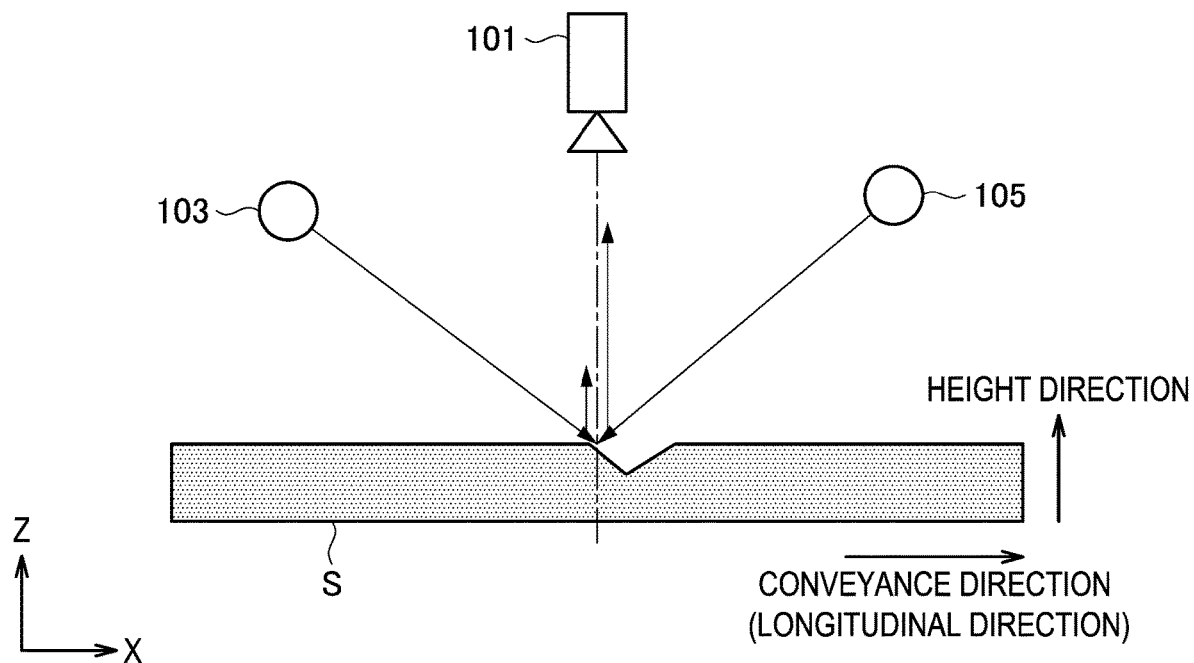
FIG. 3 is an explanatory diagram for describing the intensity of luminance of reflection light of illumination light that is acquired by a line sensor camera at a time when unevenness that is inclined with respect to a horizontal plane is present at the surface of a strip-shaped body, and shows the intensity of the luminance of reflection light at a slope that descends continuously to the right.
Figure 4:
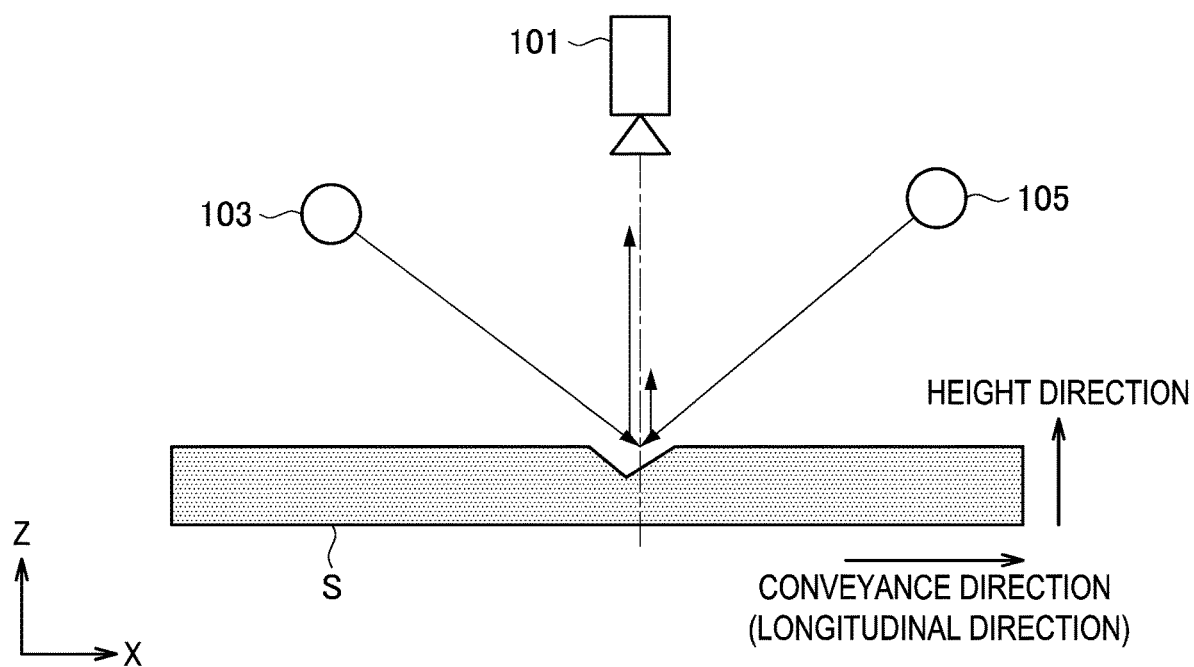
FIG. 4 is an explanatory diagram for describing the intensity of luminance of reflection light of illumination light that is acquired by a line sensor camera at a time when unevenness that is inclined with respect to a horizontal plane is present at the surface of a strip-shaped body, and shows the intensity of the luminance of reflection light at a slope that ascends continuously to the right.

First, an outline of a shape inspection apparatus for a strip-shaped body S (hereunder, also referred to simply as "shape inspection apparatus") 10 according to a first embodiment of the present invention will be described based on FIG. 1 to FIG. 4. FIG. 1 is an explanatory diagram illustrating one configuration example of the shape inspection apparatus 10 according to the present embodiment. Note that, in the following description, it is assumed that the strip-shaped body S is being conveyed in a predetermined conveyance direction on a conveyance line (not illustrated), and the conveyance direction of the strip-shaped body S corresponds to the longitudinal direction of the strip-shaped body S. FIG. 2 is an explanatory diagram for describing the intensity of luminance of reflection light of illumination light acquired by a line sensor camera 101 when the surface of the strip-shaped body S is level. FIG. 3 and FIG. 4 are explanatory diagrams for describing the intensity of luminance of reflection light of illumination light acquired by the line sensor camera 101 when unevenness that is inclined with respect to a horizontal plane is present at the surface of a strip-shaped body S.

The shape inspection apparatus 10 according to the present embodiment is an apparatus for detecting the surface shape (for example, unevenness shape) of various kinds of strip-shaped bodies S, such as a steel plate placed at a predetermined location or a steel plate conveyed on a predetermined conveyance line.

Here, a macroscopic shape of the strip-shaped body S is not particularly limited and may be, for example, a plate shape such as a slab or a billet, or may be a coil shape obtained by rolling up/winding up a metal plate. Further, components of the strip-shaped body S are also not particularly limited, and the strip-shaped body S may be various types of steel containing an iron element as the main component, various types of alloy of iron and other metal elements, or various types of nonferrous metal.

The shape inspection apparatus 10 according to the present embodiment mainly includes a measurement apparatus 100 and an arithmetic processing apparatus 200, as illustrated in FIG. 1.

Under control of the arithmetic processing apparatus 200, the measurement apparatus 100 radiates the strip-shaped body S (specifically, the surface of the strip-shaped body S) with illumination light from a first illumination light source 103 and a second illumination light source 105, respectively, and, by means of the line sensor camera 101, photographs the surface of the strip-shaped body S on which the illumination light is being radiated to thereby acquire a line image of the surface of the strip-shaped body S. The measurement apparatus 100 outputs a line image that is acquired to the arithmetic processing apparatus 200.

The arithmetic processing apparatus 200 controls measurement processing of the strip-shaped body S by the measurement apparatus 100. The arithmetic processing apparatus 200 also performs image processing on the line image acquired by the measurement apparatus 100, and calculates an inclination of the surface of the strip-shaped body S as information to be used for detecting the surface shape of the strip-shaped body S.

More specifically, in the measurement apparatus 100 according to the present embodiment, as illustrated in FIG. 2, the first illumination light source 103 and the second illumination light source 105 are arranged so that the respective optical axes are symmetric about the specular reflection direction at the surface of the strip-shaped body S of the optical axis of the line sensor camera 101. Then, the first illumination light source 103 is caused to always emit light, and the second illumination light source 105 is caused to blink, so as to repeat two lighting patterns having respective different illumination intensity ratios. Then, the surface of the strip-shaped body S is photographed by the line sensor camera 101 with the respective lighting patterns, and line images are acquired. The acquired line images are output to the arithmetic processing apparatus 200.

Based on a photographed image generated by arranging the acquired line images in the photographing order, the arithmetic processing apparatus 200 generates a first separated image that is composed of line images (corresponding to "first line images" of the present invention) photographed with a first illumination intensity ratio (a first lighting pattern) in which only the first illumination light source 103 emits light, and a second separated image that is composed of line images (corresponding to "second line images" of the present invention) photographed with a second illumination intensity ratio (a second lighting pattern) in which both the first illumination light source 103 and the second illumination light source 105 emit light. Then, by performing mixing elimination processing on the first separated image and the second separated image, the arithmetic processing apparatus 200 generates a first mixing elimination image and a second mixing elimination image, and further, generates a difference image by determining the differences between the luminance values of the first mixing elimination image and the second mixing elimination image. The arithmetic processing apparatus 200 then calculates an inclination of the surface of the strip-shaped body S based on the difference image, to thereby detect unevenness that is present at the surface of the strip-shaped body S.

For example, as illustrated in FIG. 2, when the surface of the strip-shaped body S is in a horizontal state in which the surface is orthogonal to the optical axis of the line sensor camera 101, the luminance of reflection light at the surface of the strip-shaped body S of illumination light from the first illumination light source 103 (hereunder, also referred to as "first reflection luminance"), and the luminance of reflection light at the surface of the strip-shaped body S of illumination light from the second illumination light source 105 (hereunder, also referred to as "second reflection luminance") are made to be equal in advance. By doing so, as illustrated in FIG. 3 and FIG. 4, in a case where there is unevenness (for example, a V-shaped depression) in the surface of the strip-shaped body S, the first reflection luminance and the second reflection luminance differ from each other. That is, as illustrated in FIG. 3, when illumination light is radiated onto a rightwardly descending sloped portion of the unevenness, the second reflection luminance is greater than the first reflection luminance. On the other hand, as illustrated in FIG. 4, when illumination light is radiated onto a rightwardly ascending sloped portion of the unevenness, the first reflection luminance is greater than the second reflection luminance.

Thus, although when the surface of the strip-shaped body S is level, the reflection luminances of the two illumination lights are the same and there is no difference therebetween, when there is unevenness in the surface of the strip-shaped body S, a difference arises between the reflection luminances of the two illumination lights. Accordingly, if a difference between the reflection luminances of the two illumination lights can be acquired, the surface shape of the strip-shaped body S can be acquired. Therefore, in the present embodiment, in order to obtain the surface shape of the strip-shaped body S, a first separated image composed of line images photographed with the first lighting pattern, and a second separated image composed of line images photographed with the second lighting pattern are generated, and next, with the mixing elimination processing described later for separating the reflection luminances of the two illumination lights, a first mixing elimination image and a second mixing elimination image are acquired, the differences between the luminance values of the respective mixing elimination images are determined, to thereby obtain the difference between the reflection luminances of the two illumination lights in the surface of the strip-shaped body S.

Note that, in a case where the surface of the strip-shaped body S is photographed by using an area sensor camera instead of the line sensor camera 101 with the same arrangement as in the present embodiment, since the first reflection luminance and the second reflection luminance are not the same value at locations other than directly under the camera even in a field of view, a uniform unevenness detection sensitivity cannot be obtained. Therefore, it is preferable to use a line sensor camera in the present invention.

In the shape inspection apparatus 10 according to the present embodiment, it is possible to perform measurement processing with respect to the strip-shaped body S by the measurement apparatus 100 and processing to calculate an inclination in the surface of the strip-shaped body S by the arithmetic processing apparatus 200, in real time together with conveyance of the strip-shaped body S. By paying attention to detection results that are outputted from the shape inspection apparatus 10 (more specifically, the arithmetic processing apparatus 200), it is possible for a user of the shape inspection apparatus 10 to ascertain and inspect the surface shape of the strip-shaped body S in real time. Further, it is also possible to automatically determine the surface shape of the strip-shaped body S based on an inclination in the surface of the strip-shaped body S calculated by the shape inspection apparatus 10. Hereunder, the measurement apparatus 100 and the arithmetic processing apparatus 200 are each described in detail.

[1-2. Configuration of Shape Inspection Apparatus]

(a) Measurement Apparatus

Figure 5:
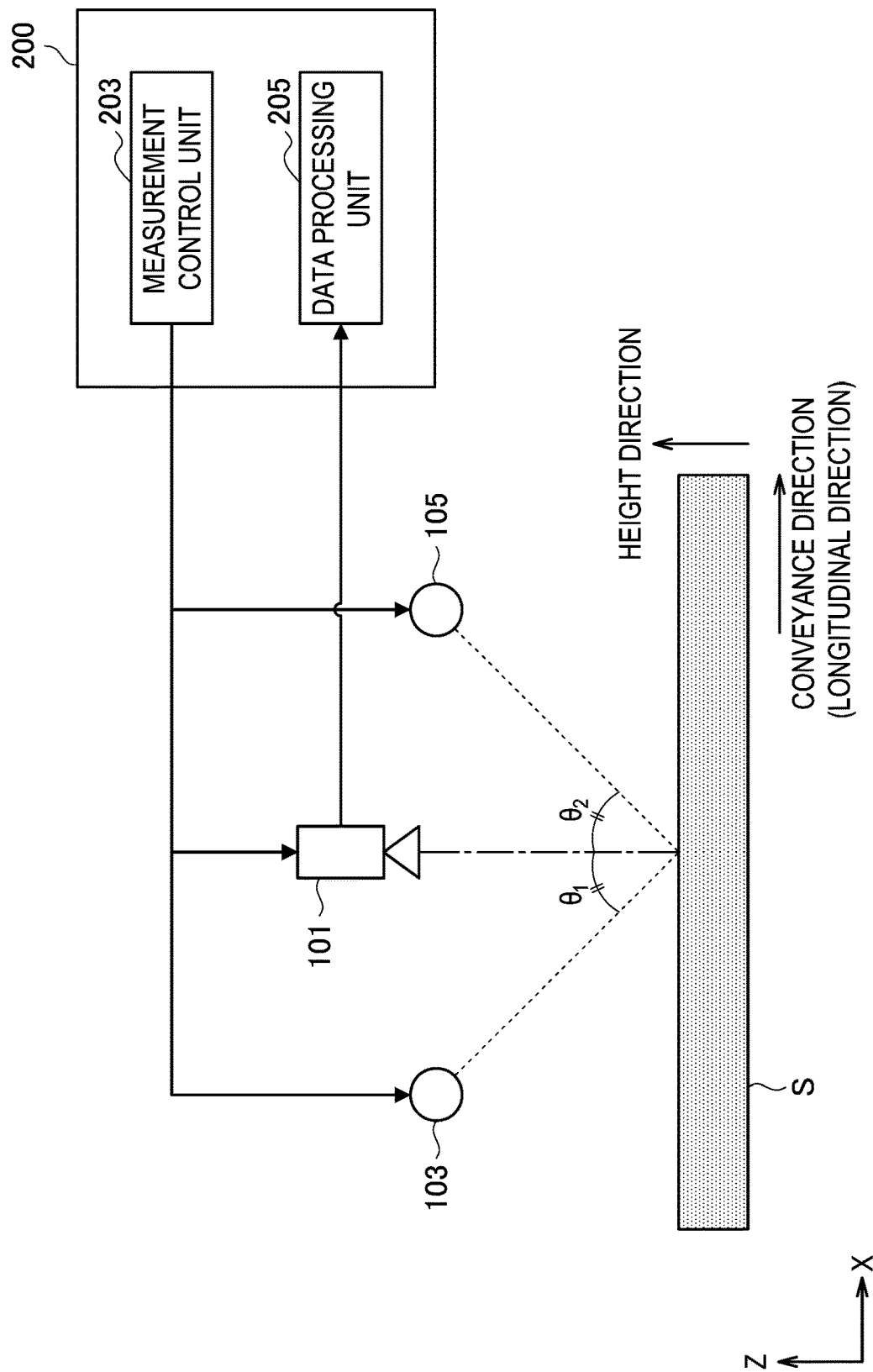
FIG. 5 is an explanatory diagram that schematically illustrates one configuration example of a measurement apparatus constituting part of the shape inspection apparatus according to the first embodiment, which illustrates a state when the strip-shaped body is viewed from a side face.
Figure 6:
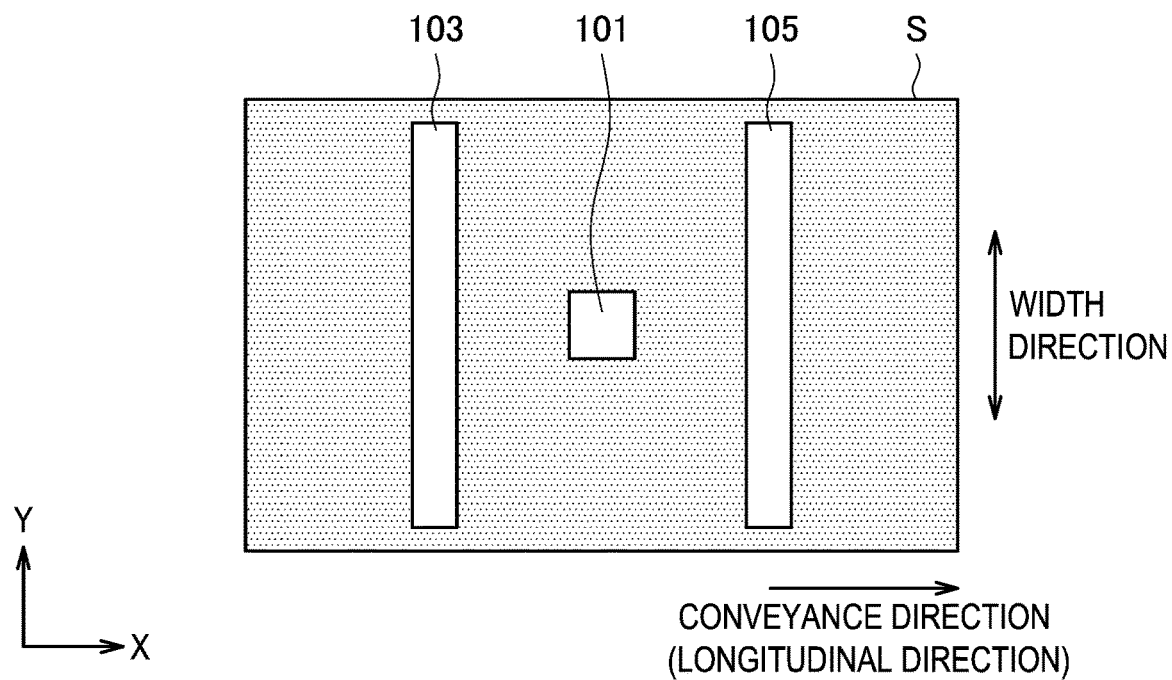
FIG. 6 is a plan view of FIG. 5.
Figure 7:
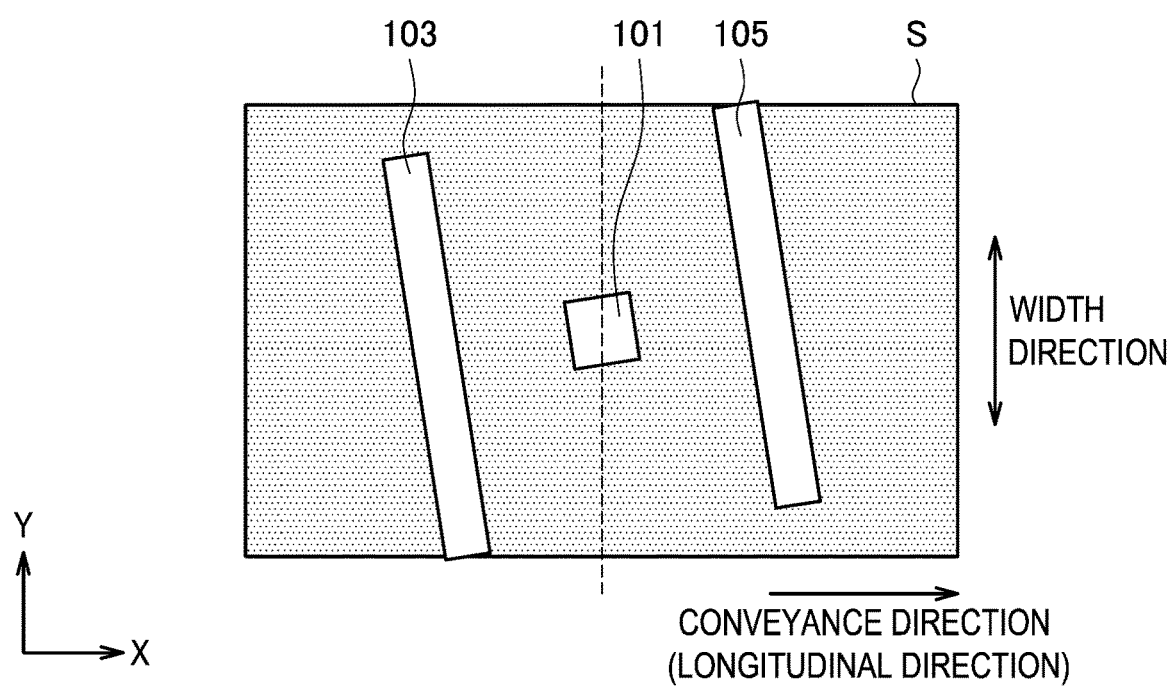
FIG. 7 is an explanatory diagram schematically illustrating another configuration example of a measurement apparatus according to the first embodiment.
Figure 8:
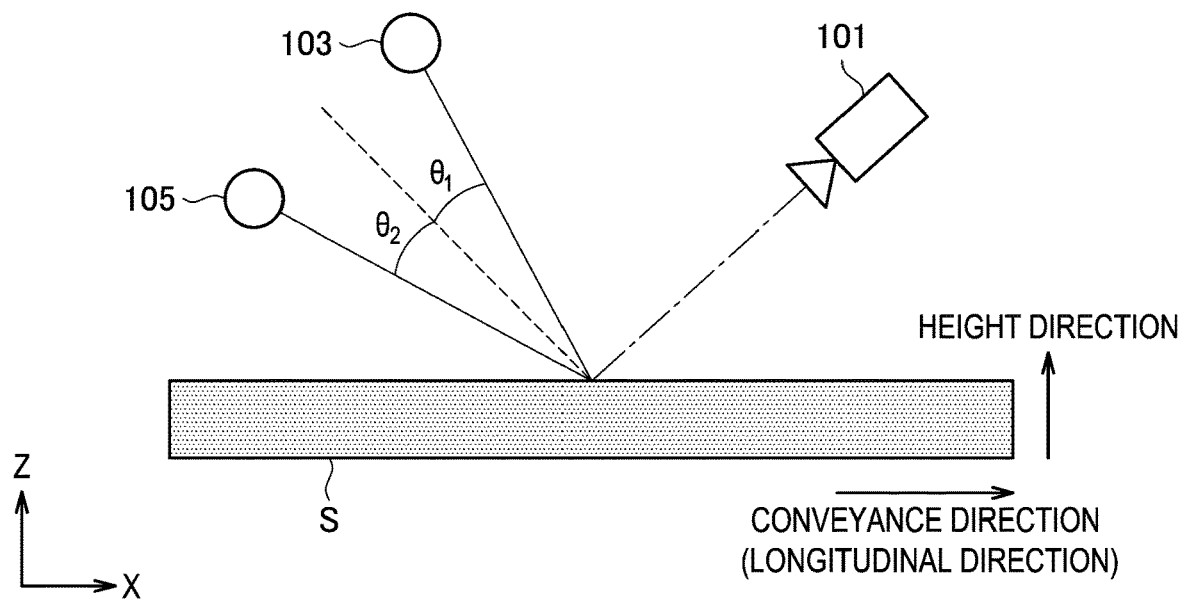
FIG. 8 is an explanatory diagram schematically illustrating another configuration example of the measurement apparatus according to the first embodiment, and shows a state in which a strip-shaped body S is viewed from a side face.

First, the measurement apparatus 100 according to the present embodiment is described in detail referring to FIG. 5 to FIG. 8. FIG. 5 is an explanatory diagram that schematically illustrates one configuration example of the measurement apparatus 100 that constitutes part of the shape inspection apparatus 10 according to the present embodiment, and illustrates a state in which the strip-shaped body S is seen from a side face. FIG. 6 is a plan view of FIG. 5. FIG. 7 is an explanatory diagram schematically illustrating another configuration example of the measurement apparatus 100 according to the present embodiment. FIG. 8 is an explanatory diagram schematically illustrating another configuration example of the measurement apparatus 100 according to the present embodiment, and shows a state in which the strip-shaped body S is viewed from a side face.

As illustrated in FIG. 5 and FIG. 6, the measurement apparatus 100 according to the present embodiment has the line sensor camera 101, the first illumination light source 103 and the second illumination light source 105. The line sensor camera 101, the first illumination light source 103 and the second illumination light source 105 are fixed by known means so that their setting positions do not change. The strip-shaped body S moves relative to the line sensor camera 101 and the respective illumination light sources 103 and 105. The line sensor camera 101 sequentially photographs the surface of the strip-shaped body S that moves in the conveyance direction (that is, the longitudinal direction of the strip-shaped body S).

(Line Sensor Camera)

The line sensor camera 101 is a photographing apparatus that photographs images in one-dimensional line units. The line sensor camera 101 may be, for example, a monochrome line sensor camera, or may be a known color line sensor camera such as a camera that adopts the 3CCD system. In the case of using a color line sensor camera, it is also possible to ascertain the color of the surface of the strip-shaped body S to be inspected.

The line sensor camera 101 is arranged above (the positive direction side of the Z-axis) the strip-shaped body S in a manner so that the optical axis thereof is perpendicular to the surface of the strip-shaped body S. The line sensor camera 101 photographs the surface of the strip-shaped body S in a state in which at least one of the first illumination light of the first illumination light source 103, and the second illumination light of the second illumination light source 105 is radiated. Specifically, based on control information from a measurement control unit 203 of the arithmetic processing apparatus 200, the measurement apparatus 100 according to the present embodiment causes the first illumination light source 103 to always emit light, and causes the second illumination light source 105 to blink, and the line sensor camera 101 photographs the surface of the strip-shaped body S with the respective lighting patterns formed by blinking. Accordingly, the line sensor camera 101 alternately acquires the line image photographed when only the illumination light of the first illumination light source 103 is radiated, and the line image photographed when the illumination lights of both the first illumination light sources 103 and the second illumination light sources 105 are radiated. Accordingly, in the photographed image generated by arranging the line images acquired by the line sensor camera 101 in the photographing order, the line images photographed when only the illumination light of the first illumination light source 103 is radiated, and the line images photographed when the illumination lights of both the first illumination light sources 103 and the second illumination light sources 105 are radiated are alternately arranged.

The line sensor camera 101 outputs the line images acquired by photographing the surface of the strip-shaped body S to the arithmetic processing apparatus 200. At the arithmetic processing apparatus 200 that receives the line images as input, a data processing unit 205 performs processing for calculating an inclination of the surface of the strip-shaped body S.

(Illumination Light Source)

The measurement apparatus 100 according to the present embodiment includes two illumination light sources, namely, the first illumination light source 103 and the second illumination light source 105. The first illumination light source 103 radiates a first illumination light at the surface of the strip-shaped body S, and the second illumination light source 105 radiates a second illumination light at the surface of the strip-shaped body S. In the present embodiment it is desirable to make the first illumination light of the first illumination light source 103 and the second illumination light of the second illumination light source 105 the same color. For example, when the first illumination light of the first illumination light source 103 is white light, the second illumination light of the second illumination light source 105 is also made white light. The colors of the first illumination light and the second illumination light are not particularly limited, and it suffices to decide the color depending on the object to be inspected. Further, the first illumination light and the second illumination light need not to be visible light, and may be infrared light or ultraviolet light. That is, as the first illumination light source 103 and the second illumination light source 105, it is good to use light sources for which radiation conditions such as wavelength, output intensity, and type of light source are substantially the same.

For example, as illustrated in FIG. 6, the first illumination light source 103 and the second illumination light source 105 are configured to be able to radiate strip-shaped illumination lights extending across almost the entire area in the width direction of the strip-shaped body S. Any light source can be utilized as the first illumination light source 103 and the second illumination light source 105 as long as it is possible to radiate illumination light in this manner. For example, the first illumination light source 103 and the second illumination light source 105 may be a rod-like LED light, or may be a light having a configuration in which a laser beam is expanded by a rod lens or the like into a linear shape. Further, as a visible-light source utilized as the first illumination light source 103 and the second illumination light source 105, a light source that uses a single-wavelength laser beam or an LED may be used, or a light source with a continuous spectrum may be used.

Further, as illustrated in FIG. 5, the first illumination light source 103 and the second illumination light source 105 are arranged so that the respective optical axes are symmetric about the specular reflection direction at the surface of the strip-shaped body S of the optical axis of the line sensor camera 101. That is, the first illumination light source 103 and the second illumination light source 105 are arranged so that the angle (first angle: $\theta_1$) formed by the optical axis of the first illumination light source 103 and the specular reflection direction of the optical axis of the line sensor camera 101 in the strip-shaped body S surface (that is, normal direction of the strip-shaped body S surface) is substantially equal to the angle (second angle: $\theta_2$) formed by the optical axis of the second illumination light source 105 and the specular reflection direction of the optical axis of the line sensor camera 101 in the strip-shaped body S surface.

Note that, the term "the first angle $\theta_1$ and the second angle $\theta_2$ are substantially equal to each other" includes not only a case where the first angle $\theta_1$ and the second angle $\theta_2$ are identical, but also a case where the first angle $\theta_1$ and the second angle $\theta_2$ have an angle difference within a range such that, when a flat surface without unevenness is irradiated with illumination light from the first illumination light source 103 or the second illumination light source 105 and photographed by the line sensor camera 101, the flat surface without unevenness appears the same with respect to the illumination light from both the first illumination light source 103 and the second illumination light source 105, taking into account changes in luminance due to dirt or the like that is present on the flat surface. This angle difference $|\theta_1-\theta_2|$ between the first angle $\theta_1$ and the second angle $\theta_2$ is, for example, preferably 10° or less, and more preferably is 5° or less. With the angle difference within such a range, when a flat surface without unevenness is irradiated with illumination light from the respective illumination light sources 103 and 105 and photographed by the line sensor camera 101, the two photographed images will appear the same.

Further, the size of the first angle $\theta_1$ and the size of the second angle $\theta_2$ are both preferably as large as possible within a range in which there is no constraint on light source installation. By this means, irregular reflection of the respective illumination light beams can be measured by the line sensor camera 101. For example, the size of the first angle $\theta_1$ and the size of the second angle $\theta_2$ are both preferably 30° or more. By making the size of the first angle $\theta_1$ and the size of the second angle $\theta_2$ not less than 30°, respectively, it is possible to further increase a relative change in a luminance value with respect to an angle change that is measured by the line sensor camera 101.

Lighting of the first illumination light source 103 and the second illumination light source 105 is controlled based on the control information from the measurement control unit 203 of the arithmetic processing apparatus 200, and the first illumination light source 103 is caused to always emit light, and the second illumination light source 105 is caused to blink, based on a control signal. The line sensor camera 101 photographs the surface of the strip-shaped body S at both timings when the second illumination light source 105 is emitting light, and when the second illumination light source 105 is turned off.

The foregoing is a description of the configuration of the measurement apparatus 100 according to the present embodiment. Although in FIG. 5 and FIG. 6 an example is illustrated in which the first illumination light source 103 is arranged on the upstream side in the conveyance direction and the second illumination light source 105 is arranged on the downstream side in the conveyance direction, the present invention is not limited to this example. For example, the second illumination light source 105 may be arranged on the upstream side in the conveyance direction, and the second illumination light source 105 may be arranged on the downstream side in the conveyance direction.

Further, in the example illustrated in FIG. 5 and FIG. 6, the first illumination light source 103 and the second illumination light source 105 are installed so that the longitudinal direction of the first illumination light source 103 and the second illumination light source 105, i.e., the longitudinal direction of the strip-shaped first illumination light and second illumination light is substantially parallel to the width direction of the strip-shaped body S. In this case, there is no difference in luminance value due to the inclination parallel to the conveyance direction (more precisely, the inclination in a case where it is rotated about an axis parallel to the conveyance direction). Therefore, in order to detect such an inclination, as illustrated in FIG. 7, each of the illumination light sources 103 and 105 may be disposed so that the longitudinal direction of the first illumination light source 103 and the second illumination light source 105 is inclined with respect to the width direction of the strip-shaped body S. By arranging each of the illumination light sources 103 and 105 to be inclined as illustrated in FIG. 7, even in a case where unevenness exists in the surface of the strip-shaped body S, and an inclination due to this unevenness arises in parallel to the conveyance direction, it is possible to detect the inclination based on the difference between the luminance values of the two reflection lights.

Further, FIG. 5 to FIG. 7 illustrate the cases where the first illumination light source 103 and the second illumination light source 105 are evenly disposed on the upstream side and the downstream side of the conveyance direction of the line sensor camera 101. However, as illustrated in FIG. 8, the line sensor camera 101 may be greatly inclined with respect to the normal direction of the strip-shaped body S, and each of the first illumination light source 103 and the second illumination light source 105 may be arranged on the side opposing to the line sensor camera 101 across the normal direction of the strip-shaped body S. That is, for example, as illustrated in FIG. 8, in a case where the line sensor camera 101 is installed on the downstream side of the conveyance direction of the strip-shaped body S, the first illumination light source 103 and the second illumination light source 105 are collectively installed on the upstream side. Further, in a case where the line sensor camera 101 is installed on the upstream side of the conveyance direction of the strip-shaped body S, the first illumination light source 103 and the second illumination light source 105 may be collectively installed in the downstream side. Also in this case, the angles $\theta_1$ and $\theta_2$ illustrated in FIG. 8 are symmetrical about the specular reflection direction at the surface of the strip-shaped body S of the optical axis of the line sensor camera 101, are preferably substantially equal to each other, and, for example, the absolute value of the difference between the angles $\theta_1$ and $\theta_2$ is preferably 5° or less ($|\theta_1-\theta_2|\leq 5°$). Further, the sizes of the angles $\theta_1$ and $\theta_2$ are preferably values as large as possible.

(b) Arithmetic Processing Apparatus

Figure 9:
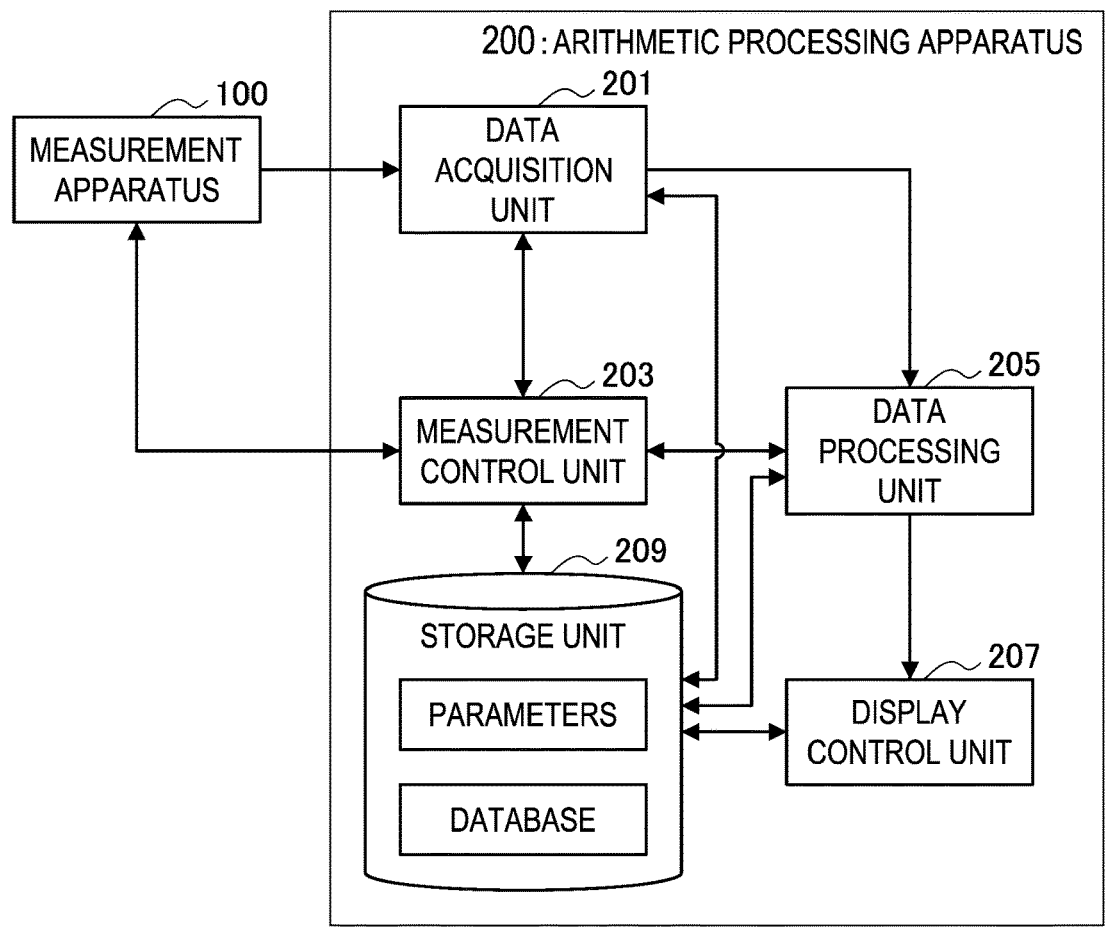
FIG. 9 is a block diagram illustrating an example of the overall configuration of an arithmetic processing apparatus according to the first embodiment.
Figure 10:
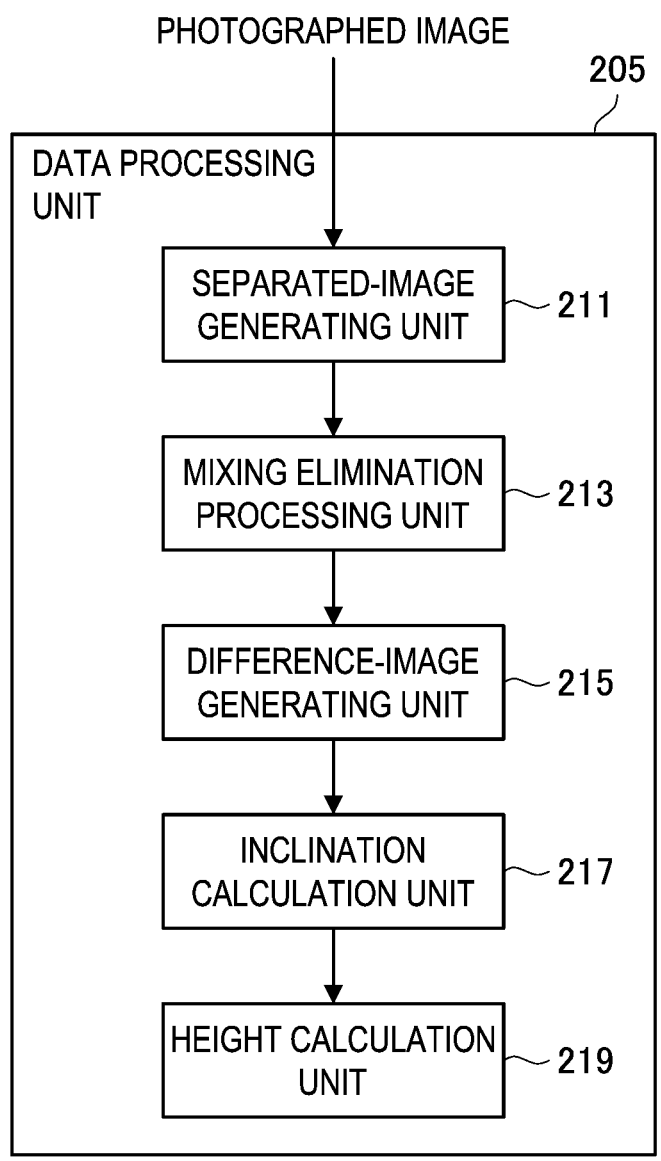
FIG. 10 is a block diagram illustrating one example of the configuration of a data processing unit according to the first embodiment.
Figure 11:
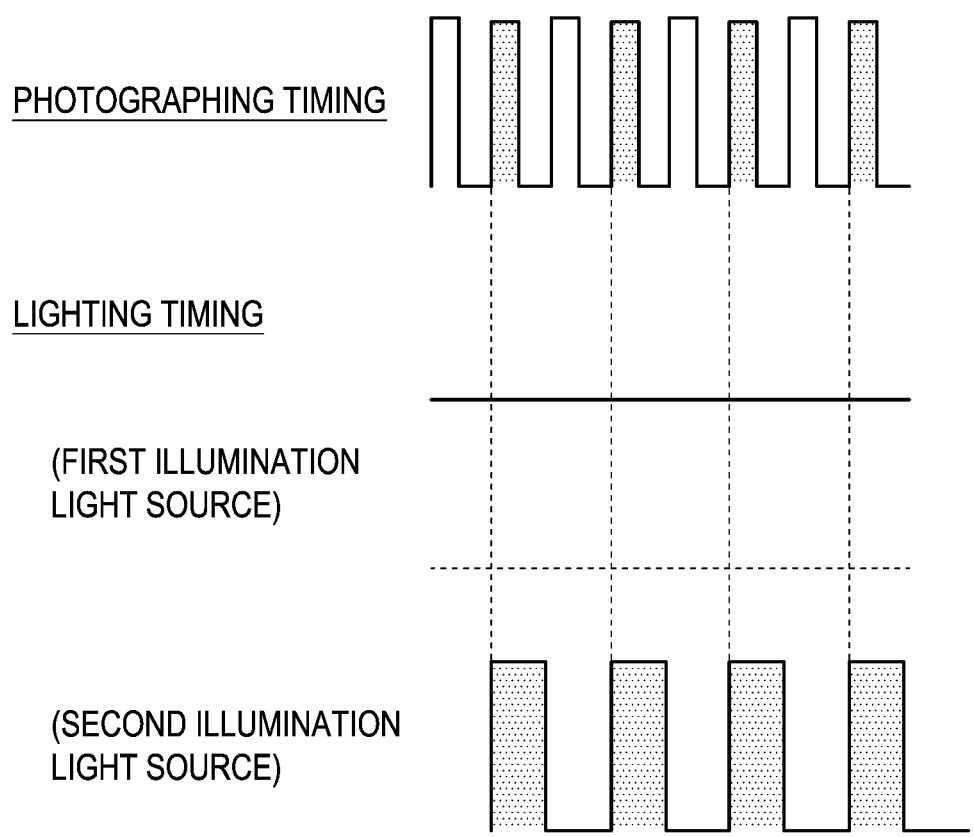
FIG. 11 is a timing chart illustrating the photographing timing of a line sensor camera, and the lighting timings of a first illumination light source and a second illumination light source according to the first embodiment.
Figure 12:
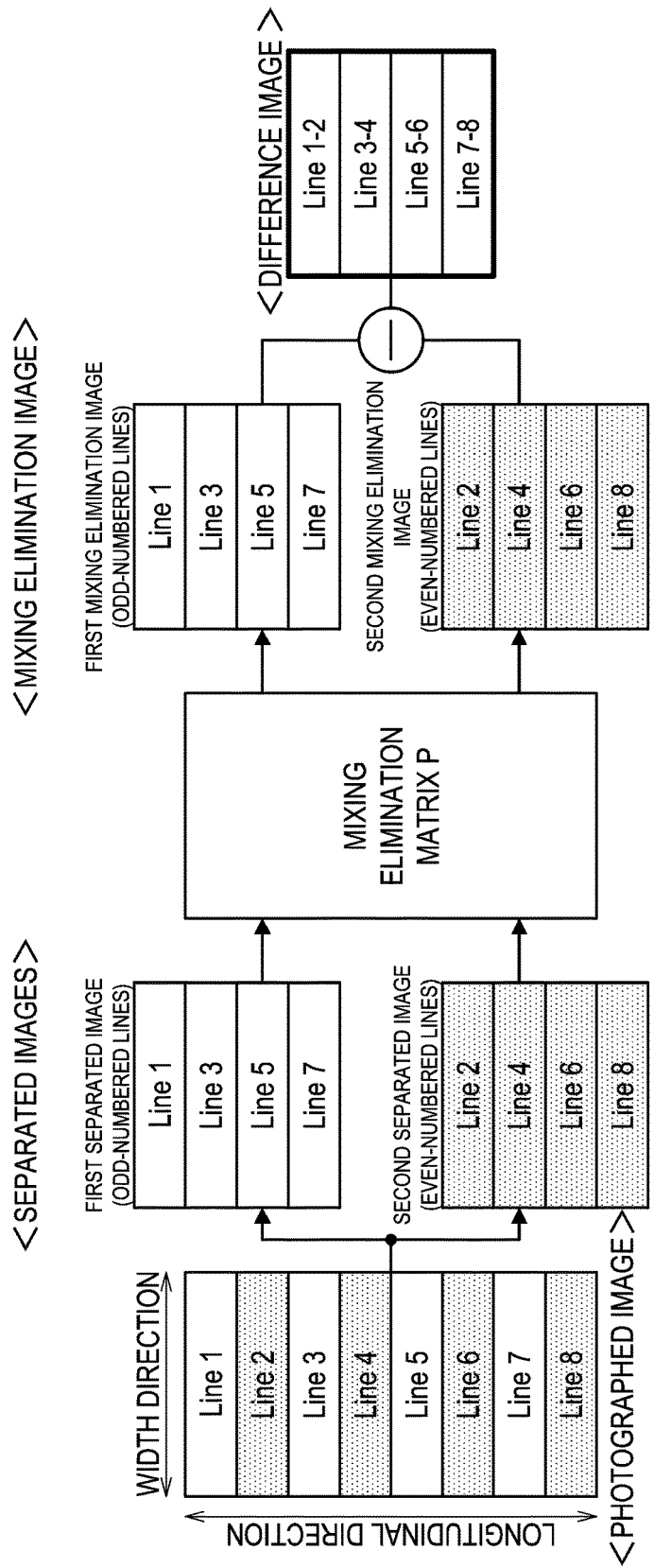
FIG. 12 is an explanatory diagram for describing generation processing of a difference image by a data processing unit according to the first embodiment.
Figure 13:
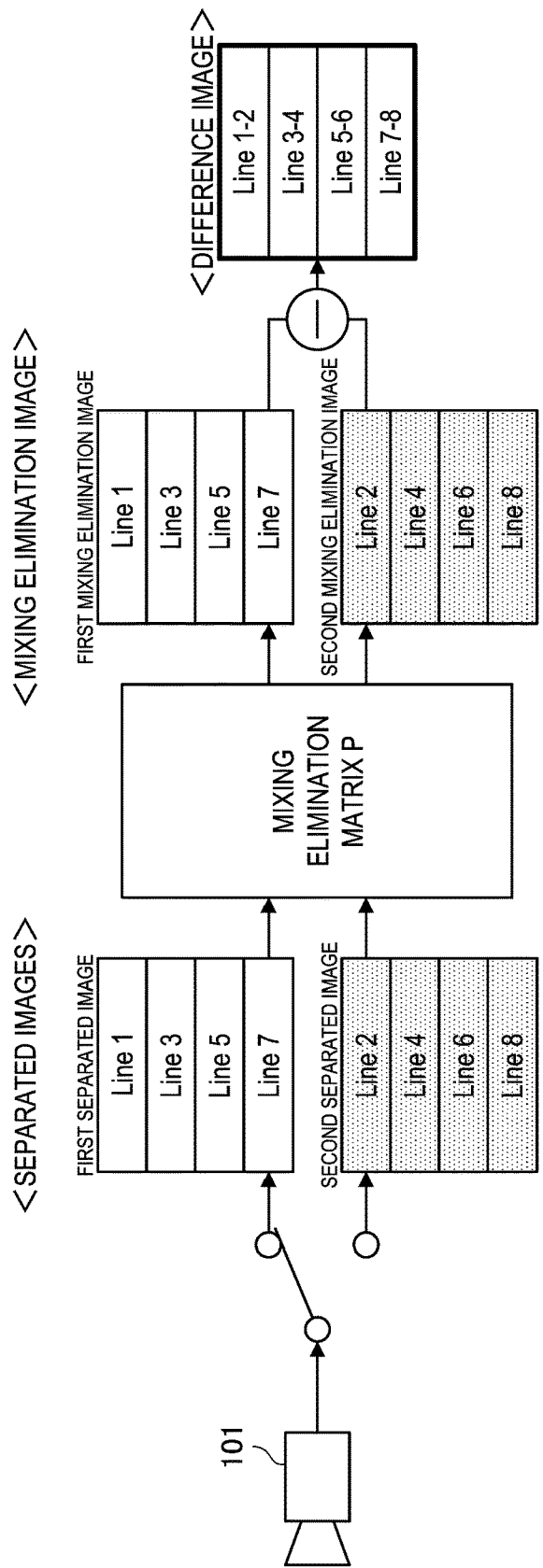
FIG. 13 is an explanatory diagram illustrating modification of the difference image generation processing performed by the data processing unit according to the first embodiment.
Figure 14:
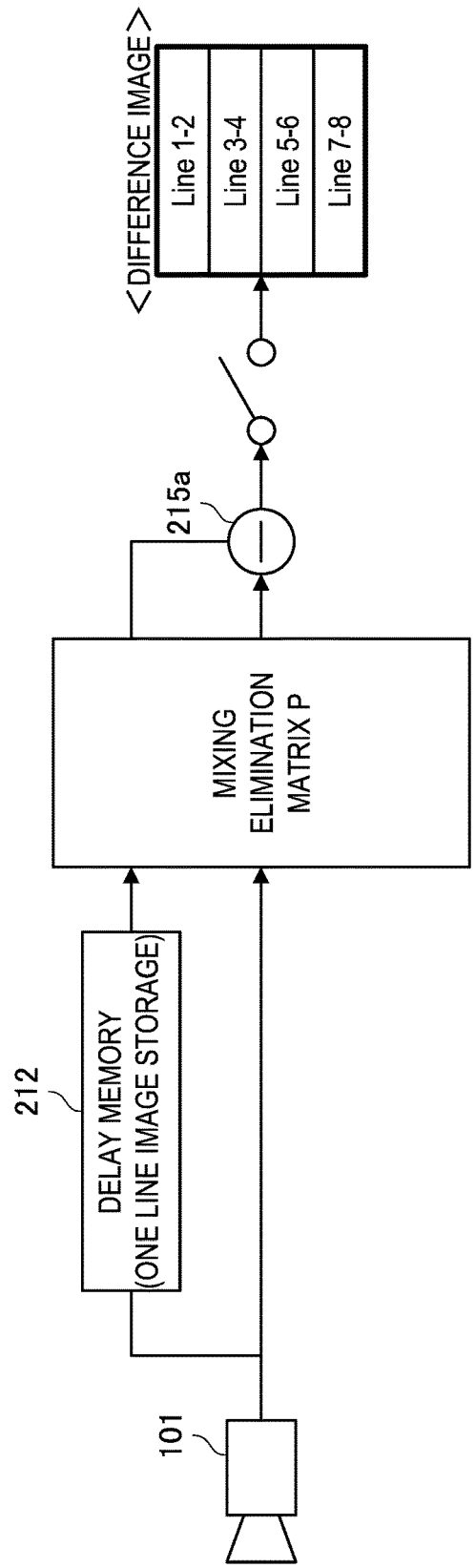
FIG. 14 is an explanatory diagram illustrating another modification of the difference image generation processing performed by the data processing unit according to the first embodiment.
Figure 15:
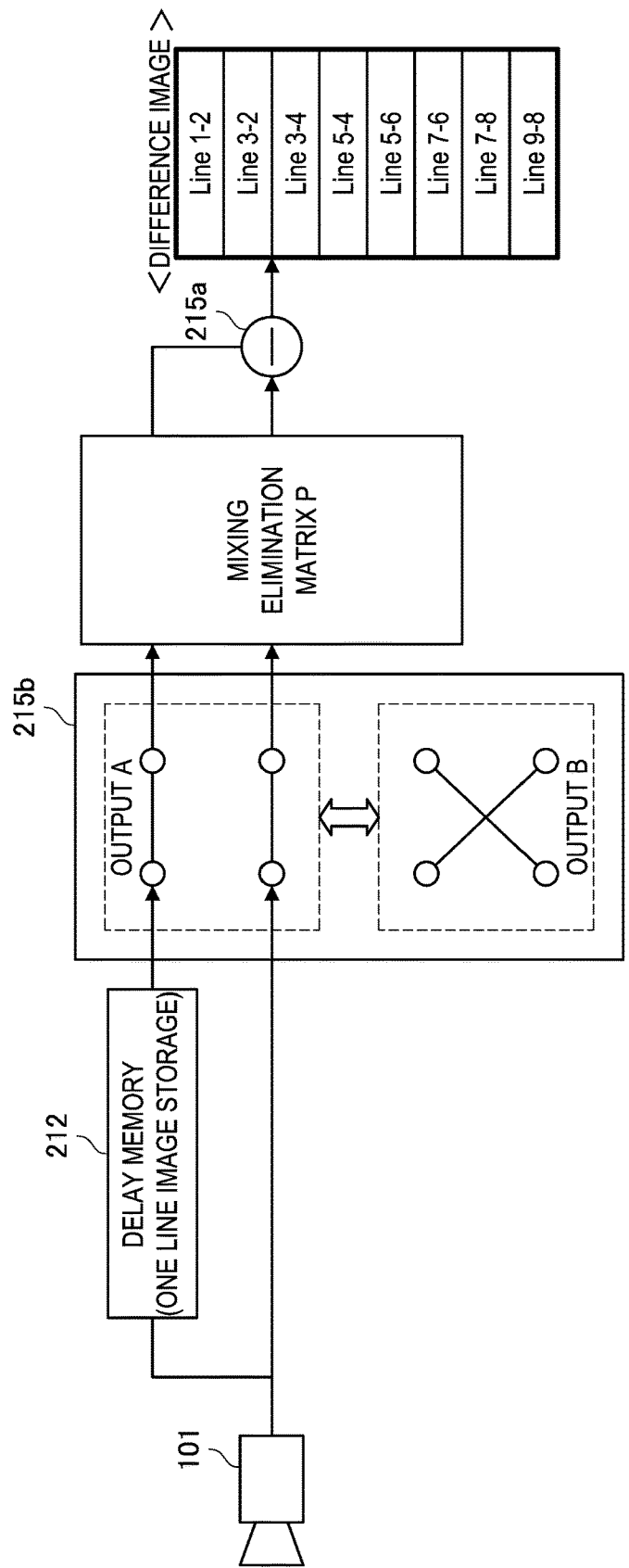
FIG. 15 is an explanatory diagram illustrating another modification of the difference image generation processing by the data processing unit according to the first embodiment.
Figure 16:
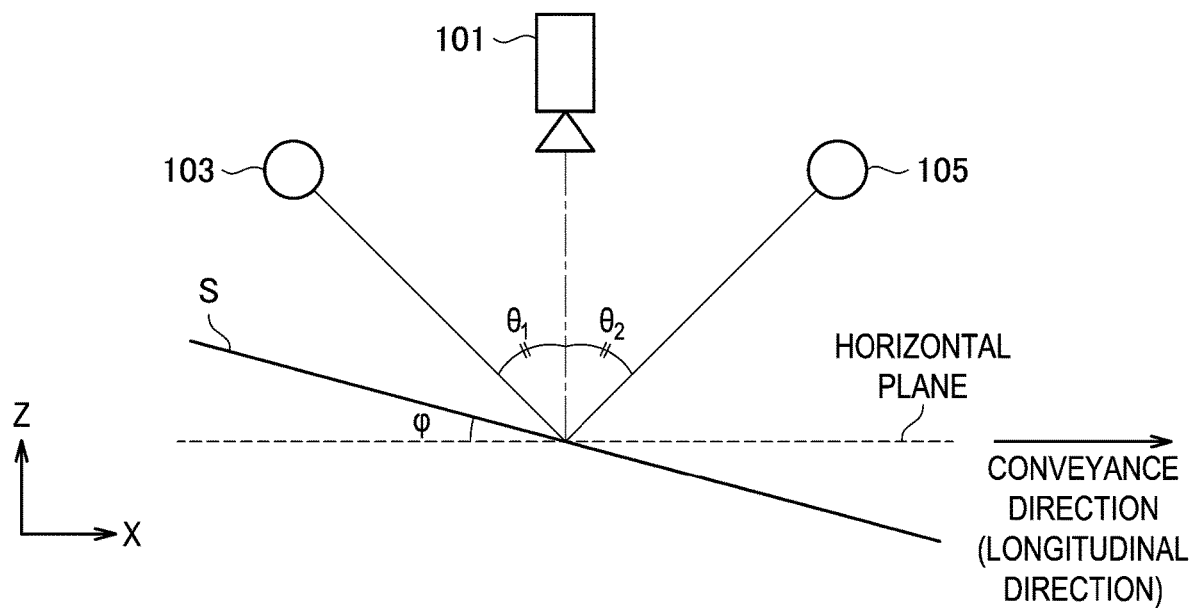
FIG. 16 is an explanatory diagram that schematically illustrates the relation between the angle of reflection of illumination light and the inclination angle of a surface in a measurement apparatus according to the first embodiment.
Figure 17:
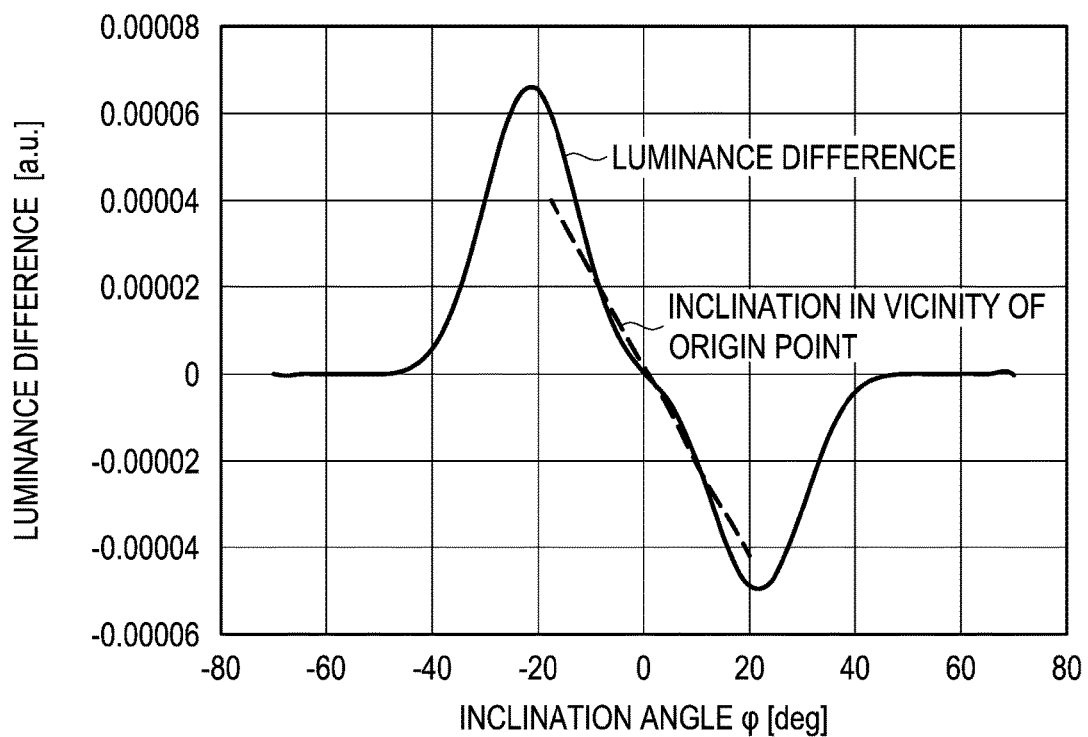
FIG. 17 is a graph illustrating an example of the positional relation between inclination of a surface of a strip-shaped body and luminance difference.

Next, the configuration of the arithmetic processing apparatus 200 that is included in the shape inspection apparatus 10 according to the present embodiment will be described in detail based on FIG. 9 to FIG. 17. FIG. 9 is a block diagram illustrating one example of the overall configuration of the arithmetic processing apparatus 200 according to the present embodiment. FIG. 10 is a block diagram illustrating one example of the configuration of the data processing unit 205 according to the present embodiment. FIG. 11 is a timing chart illustrating the photographing timing of the line sensor camera 101, and the lighting timings of the first illumination light source 103 and the second illumination light source 105 according to the present embodiment. FIG. 12 is an explanatory diagram for describing the generation processing of separated images, mixing elimination images, and a difference image from a photographed image by the data processing unit 205 according to the present embodiment. FIG. 13 to FIG. 15 are explanatory diagrams illustrating modifications of the difference image generation processing performed by the data processing unit 205 according to the present embodiment. FIG. 16 is an explanatory diagram that schematically illustrates the relation between an angle of reflection of illumination light and an inclination angle of a surface in the measurement apparatus 100 according to the present embodiment. FIG. 17 is a graph illustrating an example of the positional relation between an inclination of a surface of a strip-shaped body and luminance difference.

The arithmetic processing apparatus 200 according to the present embodiment is an apparatus that calculates an inclination of the surface of the strip-shaped body S in order to detect the surface shape of the strip-shaped body S, based on a photographed image acquired by the measurement apparatus 100. As illustrated in FIG. 9, the arithmetic processing apparatus 200 mainly includes a data acquisition unit 201, the measurement control unit 203, the data processing unit 205, a display control unit 207 and a storage unit 209.

(Data Acquisition Unit)

The data acquisition unit 201 is realized by, for example, a central processing unit (CPU), a read only memory (ROM), a random access memory (RAM), a communication device, and the like. The data acquisition unit 201 acquires a photographed image photographed by the line sensor camera 101 of the measurement apparatus 100, and transmits the photographed image to the data processing unit 205 that is described later. Further, the data acquisition unit 201 may store the acquired photographed image in association with time information relating to the date and time at which the photographed image was photographed in the storage unit 209, described later, as history information.

(Measurement Control Unit)

The measurement control unit 203 is realized by a CPU, a ROM, a RAM, a communication device and the like. The measurement control unit 203 controls measurement of the strip-shaped body S by the measurement apparatus 100 according to the present embodiment. More specifically, when starting measurement of the strip-shaped body S, the measurement control unit 203 sends control signals to the first illumination light source 103 and the second illumination light source 105 to cause the first illumination light source 103 and the second illumination light source 105 to start radiation of illumination lights.

Further, when the first illumination light source 103 and the second illumination light source 105 each start to radiate the surface of the strip-shaped body S with illumination light, the measurement control unit 203 sends a trigger signal for starting measurement to the line sensor camera 101, based on a PLG signal that is sent at regular intervals from a driving mechanism or the like for changing a relative position between the strip-shaped body S and the measurement apparatus 100 (for example, a PLG signal that is output each time the strip-shaped body S moves 1 mm). By this means, it is possible for the measurement apparatus 100 to acquire measurement data (a line image) at each position of the strip-shaped body S in the conveyance direction.

The measurement control unit 203 according to the present embodiment controls the first illumination light source 103 to always emit light, and also controls the second illumination light source 105 to repeat blinking, each time the line sensor camera 101 photographs one line. That is, the measurement control unit 203 controls the two illumination light sources to modulate the luminescence intensities at a frequency that is one-half of the frequency of the scan rate of the line sensor camera 101, and to emit light by sequentially repeating the two different patterns of the illumination intensity ratios. Further, the measurement control unit 203 controls the photographing timing of the line sensor camera 101 so that the surface of the strip-shaped body S is photographed by the line sensor camera 101 at the respective radiation timings of the first illumination light source 103 and the second illumination light source 105.

(Data Processing Unit)

The data processing unit 205 is realized by, for example, a CPU, a ROM, a RAM, and a communication device or the like. The data processing unit 205 processes line images acquired by the measurement apparatus 100, and calculates an inclination of the surface of the strip-shaped body S. As illustrated in FIG. 10, the data processing unit 205 according to the present embodiment includes, for example, a separated-image generating unit 211, a mixing elimination processing unit 213, a difference-image generating unit 215, an inclination calculation unit 217 and a height calculation unit 219.

The separated-image generating unit 211 is realized by, for example, a CPU, a ROM, a RAM and the like, and as illustrated in FIG. 11, based on a photographed image, generates a first separated image composed of line acquired at lighting timings of the first illumination light source 103, and a second separated image composed of line acquired at lighting timings of the first illumination light source 103 an the second illumination light source 105.

As illustrated in FIG. 12, a photographed image is constituted by alternately arranging the line images acquired when only the first illumination light source 103 is emitting light, and the line images acquired when both the first illumination light sources 103 and the second illumination light sources 105 are emitting light in the photographing order. For example, assume that line images of odd-numbered lines 1, 3, 5 and 7 are acquired at timings at which only the first illumination light source 103 is emitting light, and line images of the even-numbered lines 2, 4, 6 and 8 are acquired at timings at which the first illumination light source 103 and the second illumination light source 105 are emitting lights. At such time, as illustrated in FIG. 12, the photographed image is an image in which line images of odd-numbered lines and line images of even-numbered lines are alternately arranged along the longitudinal direction.

The separated-image generating unit 211 separates this kind of photographed image into line images of odd-numbered lines photographed when only the first illumination light source 103 is emitting light, and line images of even-numbered lines acquired when the first illumination light source 103 and the second illumination light source 105 are emitting lights. The line images separated into two groups are arranged in photographing order, respectively, by the separated-image generating unit 211 to thereby generate two separated images. For example, a separated image composed of line images of odd-numbered lines will be taken as a first separated image, and a separated image composed of line images of even-numbered lines will be taken as a second separated image. Accordingly, the first separated image is composed of line images acquired when only the first illumination light source 103 is emitting light, and the second separated image is composed of line images acquired when the first illumination light source 103 and the second illumination light source 105 are emitting lights.

Upon generating the first separated image and the second separated image, the separated-image generating unit 211 outputs the first separated image and the second separated image to the mixing elimination processing unit 213.

The mixing elimination processing unit 213 is realized by, for example, a CPU, a ROM, a RAM and the like, and performs processing for removing, from the first separated images and the second separated images, the mixed component included in these separated images. In the present embodiment, the line sensor cameras 101 has a timing of photographing the strip-shaped body S in a state where the first illumination light source 103 and the second illumination light source 105 are both emitting light. Therefore, not only the reflection light of the illumination light of the first illumination light source 103, but also the reflection light of the illumination light of the second illumination light source 105 are equally included in the second separated image generated at this timing. Therefore, illumination components other than the reflection light of the illumination light of the illumination light source that should be originally included are removed by the mixing elimination processing unit 213, and the mixing between the images is eliminated.

Specifically, the mixing between the images can be eliminated by performing a matrix operation on the separated images generated by the separated-image generating unit 211. That is, when adjacent lines (the line 1 and the line 2, the line 3 and the line 4, and the like) can be considered to be the same region on the strip-shaped body S by improving the resolution of the lines, only the component of the second illumination light source 105 can be removed by subtracting the first separated image from the second separated image. When it is assumed that the first separated image is $S_o$, the second separated image is $S_e$, the first mixing elimination image corresponding to the first illumination light source 103 is $T_o$, and the second mixing elimination image is $T_e$, this operation can be represented by a determinant. Mixing elimination P for obtaining a mixing elimination image from the separated images by performing a mixing elimination operation is expressed by the following formula (1) and formula (2).

[Expression 1]

$$\begin{bmatrix} T_o \\ T_e \end{bmatrix} = P \begin{bmatrix} S_o \\ S_e \end{bmatrix} \quad (1)$$

$$P = \begin{bmatrix} 1 & 0 \\ -1 & 1 \end{bmatrix} \quad (2)$$

The mixing elimination processing unit 213 performs a matrix operation to each of the first separated image and the second separated image with a separation matrix P expressed by the formula (2), to thereby obtain the first mixing elimination image obtained by removing the illumination component of the second illumination light source from the first separated image, and the second mixing elimination image obtained by removing the illumination component of the first illumination light source from the second separated image. Upon generating the first mixing elimination image and the second mixing elimination image, the mixing elimination processing unit 213 outputs the first mixing elimination image and the second mixing elimination image to the difference-image generating unit 215.

The difference-image generating unit 215 is realized by, for example, a CPU, a ROM, a RAM and the like, and generates a difference image between the first mixing elimination image and the second mixing elimination image. For example, when a first mixing elimination image and a second mixing elimination image are generated as illustrated in FIG. 12, the difference-image generating unit 215 calculates the differences between luminance values of picture elements corresponding to the first mixing elimination image and second mixing elimination image, and generates a difference image that is represented by the differences between the luminance values. Portions at which luminance values differ between the first mixing elimination image and second mixing elimination image appear in the difference image. The difference-image generating unit 215 outputs the generated difference image to the inclination calculation unit 217.

Note that, in the generation processing of a difference image, it is not necessarily required to generate a photographed image, separated images (the first separated image and the second separated image), and mixing elimination images (the first mixing elimination image and the second mixing elimination image) as illustrated in FIG. 12.

For example, as illustrated in FIG. 13, even if a photographed image in which line images acquired by the line sensor camera 101 are arranged in photographing order is not generated, the separated-image generating unit 211 can generate separated images. In this case, each time the line sensor camera 101 acquires a line image, the line sensor camera 101 outputs the line image to the separated-image generating unit 211. The separated-image generating unit 211 distributes the line images input from the line sensor camera 101 to a first memory that records a first separated image and a second memory that records a second separated image, and thus generates a first separated image and a second separated image. Distribution of the line images input from the line sensor camera 101 may be performed, for example, by switching the memory that is the output destination of the line image at each photographing timing of the line sensor camera 101.

Further, for example, as illustrated in FIG. 14 and FIG. 15, it is also possible to generate a difference image without generating a photographed image, separated images, and mixing elimination images. In this case, it is not necessary to provide the separated-image generating unit 211 and the mixing elimination processing unit 213 in the data processing unit 205, and line images input from the line sensor camera 101 are processed at the difference-image generating unit 215. At this time, the data processing unit 205 includes a delay memory 212 that stores one line image.

In the example in FIG. 14, line images that are input from the line sensor camera 101 are respectively output to a differentiating device 215a and also stored in the delay memory 212. Further, the line image output to the differentiating device 215a is subjected to the mixing elimination processing with a mixing elimination matrix P, and is thereafter output to the differentiating device 215a. The line image that is stored in the delay memory 212 is subjected to the mixing elimination processing with the mixing elimination matrix P at a delay that is equivalent to one photographing timing, and is thereafter output to the differentiating device 215a.

For example, the difference-image generating unit 215 outputs a line image acquired at a first photographing timing (hereinafter, referred to as "first line image") to the differentiating device 215a, and also stores the first line image in the delay memory 212. At this time, output from the differentiating device 215a to a difference image memory that records a difference image is not performed. Next, when a line image acquired at a second photographing timing (hereinafter, referred to as "second line image") is input, the difference-image generating unit 215 similarly outputs the second line image to the differentiating device 215a and also stores the second line image in the delay memory 212. At such time, before the second line image is stored, the first line image is output from the delay memory 212 to the differentiating device 215a. This first line image is subjected to the mixing elimination processing, before being output to the differentiating device 215a. The differentiating device 215a determines the difference between luminance values of the first line image and the second line image subjected to the mixing elimination processing, and outputs the difference between these line images to a difference image memory. Thereafter, similar processing is repeated each time line images are input. By making it possible to directly calculate differences between luminance values from line images using the delay memory 212 in this way, a difference image can be generated without generating separated images.

Further, although in the example in FIG. 14 a configuration is adopted so as output differences between luminance values of line images to the difference image memory at intervals of every second photographing timing, a configuration can also be adopted so as output differences between luminance values of line images to the difference image memory at each photographing timing. For example, as illustrated in FIG. 15, a switch 215b that interchanges the order of line images for which a difference between luminance values is to be determined is provided between the delay memory 212 and the differentiating device 215a. With respect to the output of line images, the switch 215b can set an output A or an output B. Although the switch 215b is provided between the delay memory 212 and the mixing elimination matrix P in FIG. 15, the switch 215b may be provided between the mixing elimination matrix P and the differentiating device 215a.

The output A outputs a line image acquired at an $n^{th}$ photographing timing that is stored in the delay memory 212 (hereinafter, referred to as "$n^{th}$ line image") and a line image acquired at an $n+1^{th}$ photographing timing (hereinafter, referred to as "$n+1^{th}$ line image") in that order to the differentiating device 215a. At such time, the differentiating device 215a subtracts the luminance values of the $n+1^{th}$ line image from the luminance values of $n^{th}$ line image to thereby calculate the difference therebetween. The output B interchanges the order of the $n^{th}$ line image that is stored in the delay memory 212 and the $n+1^{th}$ line image, and outputs the line images to the differentiating device 215a. At such time, the differentiating device 215a subtracts the luminance values of the $n^{th}$ line image from the luminance values of the $n+1^{th}$ line image to thereby calculate the difference therebetween.

The switch 215b is switched each time one line image is input from the line sensor camera 101. Each line image that is output from the switch 215b is subjected to the mixing elimination processing with the mixing elimination matrix P, and is thereafter output to the differentiating device 215a. The differentiating device 215a calculates a difference between the luminance values of line images each time one line image is input from the line sensor camera 101, and outputs the difference to the difference image memory. By this means, a difference image that is generated is the same size as the photographed image in which the line images acquired by the line sensor camera 101 are arranged in photographing order.

In this case, the size in the longitudinal direction of a difference image that is generated by the configuration illustrated in FIG. 12 to FIG. 14 is one-half of the size of the photographed image. This is because the second illumination light source 105 is caused to emit light at a frequency that is one-half of the frequency of the scan rate of the line sensor camera 101, and the first separated image and the second separated image of FIG. 12 and FIG. 13, the first mixing elimination image and the second mixing elimination image of FIG. 12 and FIG. 13, and the difference image of FIG. 12 to FIG. 14 can also be said as the images acquired with one-half of the photographing resolution of the line sensor camera 101. Therefore, it is desirable that the photographing resolution of the line sensor camera 101 is set to twice the required resolution.

Further, with respect to the first separated image and the second separated image in FIG. 12 and FIG. 13, interpolation processing may be performed to make the image size match the size of the photographed image. As the interpolation processing, for example, adjacent picture element interpolation that interpolates a separated image by arraying two each of the respective line images in the manner of lines 1, 1, 3, 3, 5, 5, 7, 7 may be performed. Alternatively, linear interpolation that interpolates the average values of luminance values of adjacent picture elements in adjacent line images with respect to the original image of a separated image may be performed. Since interpolation is performed with identical luminance values in the adjacent picture element interpolation, the changes in the luminance values of a separated image are bumpy. In linear interpolation, the changes in the luminance values of adjacent picture elements can be made smooth. Thus, it is possible to reproduce luminance changes that resemble the form of unevenness that is on the surface of the strip-shaped body S while maintaining the resolution of the original image, by performing linear interpolation with respect to the original image of a separated image.

Returning to the description of FIG. 10, the inclination calculation unit 217 is realized by, for example, a CPU, a ROM, a RAM and the like, and calculates an inclination of the surface of the strip-shaped body S based on a difference image generated by the difference-image generating unit 215. The inclination calculation unit 217 takes a difference image generated by the difference-image generating unit 215 as luminance difference data that represents differences in luminance values, and calculates a direction and magnitude of an inclination of the surface of the strip-shaped body S based on the relationship between luminance differences and the inclination of the surface of the strip-shaped body S.

The relationship between luminance differences and an inclination of the surface of the strip-shaped body S will now be described based on FIG. 16 and FIG. 17. In the present embodiment the first illumination light source 103 and the second illumination light source 105 are installed in advance so that the reflection luminances of the illumination lights thereof are substantially equal to each other. Therefore, in a case where the surface of the strip-shaped body S that is being kept level is photographed, a luminance difference between the luminance of reflection light of the first illumination light and the luminance of reflection light of the second illumination light which are detected by the line sensor camera 101 are equal. On the other hand, for example, as illustrated in FIG. 13, assume that the surface of the strip-shaped body S is inclined by an inclination angle $\phi$ when taking a horizontal plane perpendicular to the optical axis of the line sensor camera 101 as a reference. In this case, when an inclination in the longitudinal direction of the strip-shaped body S arises at the surface of the strip-shaped body S that is being kept level, the degrees of reflection of the respective illumination lights change and, as illustrated in FIG. 17, the luminance difference between the respective reflection lights changes.

FIG. 17 reveals that when the inclination of the graph near the origin point (i.e., the conversion coefficient) is denoted by $\alpha$, a luminance difference $\Delta L$ and the inclination angle $\varphi$ can be expressed by the relation $\Delta L = \alpha \times \varphi$. Hence, the inclination calculation unit 217 can convert each luminance difference $\Delta L$ into an inclination angle $\varphi$ of the surface by using the conversion coefficient $\alpha$ and a luminance difference $\Delta L$ of each picture element determined from the difference image. The inclination of the surface of the strip-shaped body S of interest corresponds to a tangent at the inclination angle $\varphi$ obtained by converting from the luminance difference. Hence, the inclination calculation unit 217 can calculate the inclination of the surface of the strip-shaped body S of interest by calculating $\tan \varphi$ which is the tangent at the calculated inclination angle $\varphi$. The inclination calculated in this manner expresses the direction of the inclination by whether its sign is positive or negative, and expresses the specific magnitude of the inclination by its absolute value.

Note that information relating to the conversion coefficient $\alpha$ that is specified in advance is stored in the storage unit 209, for example. When performing inclination calculation processing, the inclination calculation unit 217 acquires the information relating to the conversion coefficient from the storage unit 209, and converts the luminance difference into an inclination angle. By performing the above processing for all elements of the luminance difference data, the inclination calculation unit 217 obtains a data group of inclination values (in other words, map data relating to inclination values) for the entire surface of the strip-shaped body S. The data group of inclination values obtained in this manner serves as information for inspection that is used when inspecting the shape (specifically, surface shape) of the strip-shaped body S. Further, it is also possible to convert the information for inspection into an image by replacing inclination values included in the information for inspection with high/low of luminance values or gradations. By converting the generated map data relating to inclinations into an image to form an inclination image, it is also possible to perform shape inspection based on the inclination image.

Furthermore, the inclination calculation unit 217 can perform inspection of the shape of the surface of the strip-shaped body S by comparing the calculated inclination with a predetermined threshold value. That is, a threshold value for the inclination of the surface when an abnormal portion is present at the surface of the strip-shaped body S is specified in advance by performing known statistical processing or the like on the basis of past operation data or the like, and the threshold value is stored in the storage unit 209 or the like. It is then possible for the inclination calculation unit 217 to perform an inspection to determine whether an abnormal portion is present at the surface of the strip-shaped body S of interest by specifying the magnitude relation between the calculated inclination value and the threshold value.

The inclination calculation unit 217 outputs the data relating to the calculated inclination of the surface of the strip-shaped body S to the height calculation unit 219.

The height calculation unit 219 is realized by, for example, a CPU, a ROM, a RAM and the like, and calculates the height of the surface of the strip-shaped body S of interest by using the inclination of the surface of the strip-shaped body S calculated by the inclination calculation unit 217.

Specifically, the height calculation unit 219 integrates the inclination $\tan \varphi$ of the surface of the strip-shaped body S calculated by the inclination calculation unit 217 along the longitudinal direction of the strip-shaped body S, which is the relative movement direction of the line sensor camera 101 and the strip-shaped body S (in other words, the scanning direction of the line sensor camera 101), and thereby calculates the height of the surface of the strip-shaped body S.

By performing the aforementioned integrating processing for all elements of the data relating to inclinations of the surface, the height calculation unit 219 can obtain a data group relating to surface heights (in other words, map data relating to surface heights) for the entire surface of the strip-shaped body S. The data group relating to surface heights obtained in this manner serves as information for inspection that is used when inspecting the shape (specifically, surface shape) of the strip-shaped body S. Further, it is also possible to convert the information for inspection into an image by replacing values relating to surface heights included in the information for inspection with high/low of luminance values or gradations. By converting the generated map data relating to surface heights into an image to form a height image, it is also possible to perform shape inspection based on the height image.

The data processing unit 205 that is equipped with the aforementioned functions calculates an inclination of the surface of the strip-shaped body S, and upon ending processing to calculate information for inspection for inspecting the surface shape of the strip-shaped body S, the data processing unit 205 transmits information relating to the obtained processing result to the display control unit 207.

(Display Control Unit)

Returning to the description of FIG. 9, the display control unit 207 is realized by, for example, a CPU, a ROM, a RAM and an output device or the like. The display control unit 207 performs display control when displaying various processing results including calculation results of information for inspection relating to the surface shape of the strip-shaped body S which are transmitted from the data processing unit 205, on an output device such as a display that is included in the arithmetic processing apparatus 200, or an output device provided outside the arithmetic processing apparatus 200 or the like. By this means it is possible for a user of the shape inspection apparatus 10 to ascertain, on the spot, the results of various processing, such as the inclination or height of the surface of the strip-shaped body S.

(Storage Unit)

The storage unit 209 is realized by, for example, a RAM included in the arithmetic processing apparatus 200 according to the present embodiment or a storage device or the like. In the storage unit 209, various parameters and ongoing processes or the like that the arithmetic processing apparatus 200 according to the present embodiment needs to save when performing some sort of processing, or various databases and programs or the like are recorded as appropriate. It is possible for the data acquisition unit 201, the measurement control unit 203, the data processing unit 205, the display control unit 207 and the like to freely perform data read/write operations with respect to the storage unit 209.

An example of the functions of the arithmetic processing apparatus 200 according to the present embodiment has been illustrated in the foregoing. Each of the aforementioned constituent elements may be constituted using a general-purpose member or circuit, or may be constituted by hardware specialized for the function of each constituent element. Further, a CPU or the like may perform all of the functions of the respective constituent elements. Thus, the configuration that is utilized can be changed as appropriate, according to the technology level at the time of implementing the present embodiment.

Note that a computer program for realizing each function of the arithmetic processing apparatus according to the present embodiment as described above can be created and implemented in a personal computer or the like. Further, a computer-readable recording medium that stores such a computer program can also be provided. For example, the recording medium is a magnetic disk, an optical disc, a magneto-optical disk, a flash memory or the like. The aforementioned computer program may also be delivered via a network, for example, without using a recording medium.

[1-3. Shape Inspection Method]

Figure 18:
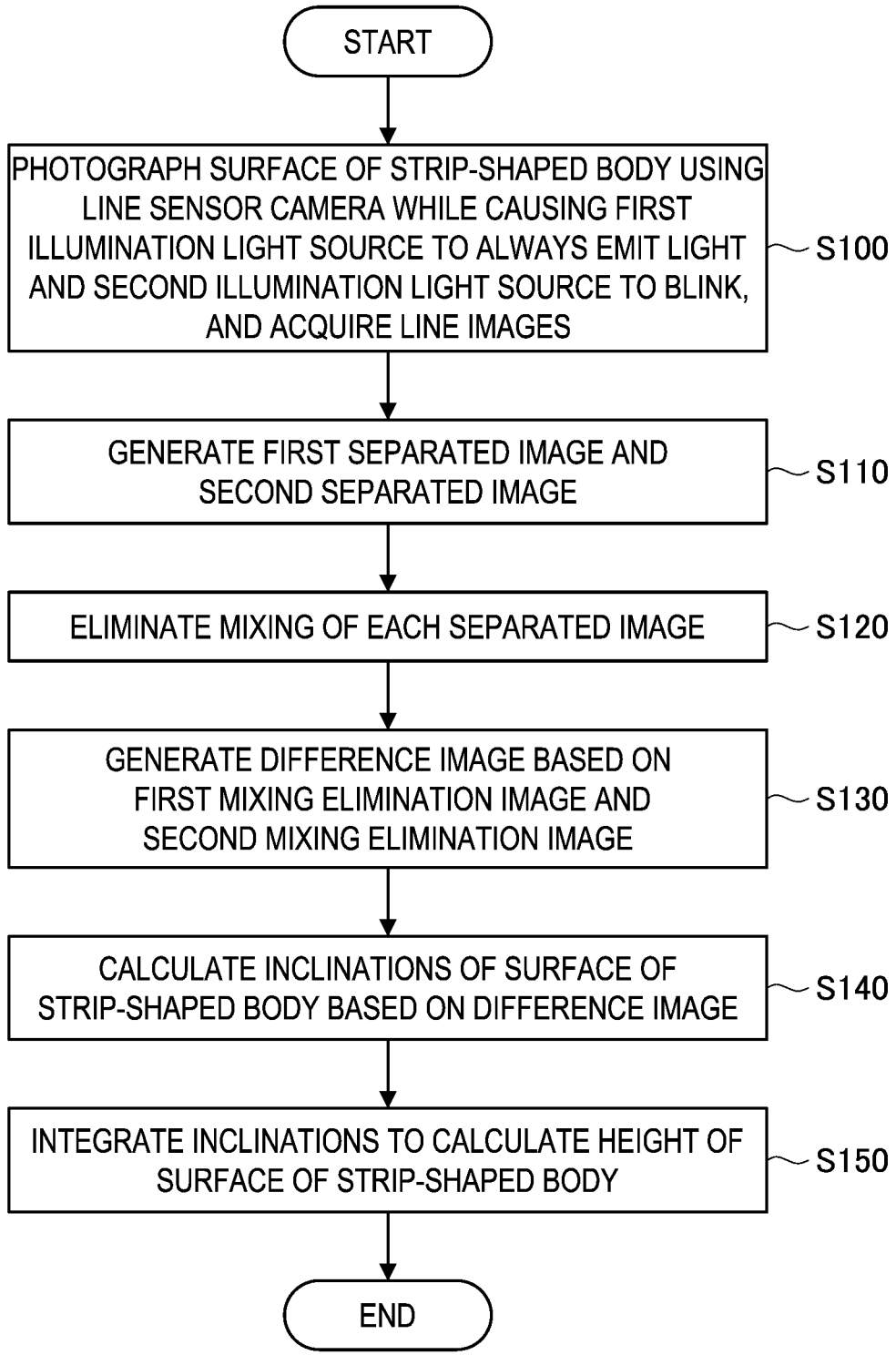
FIG. 18 is a flowchart illustrating an example of a shape inspection method according to the first embodiment.

One example of a shape inspection method that is performed using the shape inspection apparatus 10 according to the present embodiment will now be described based on FIG. 18. FIG. 18 is a flowchart illustrating an example of a shape inspection method according to the present embodiment.

As illustrated in FIG. 18, first, by means of the measurement apparatus 100 of the shape inspection apparatus 10, under control of the measurement control unit 203 of the arithmetic processing apparatus 200, while causing the first illumination light source 103 to always emit light, and causing the second illumination light source 105 to emit light at a frequency that is one-half of the frequency of the scan rate of the line sensor camera 101, a predetermined region of the surface of the strip-shaped body S is photographed by means of the line sensor camera 101, thereby acquiring line images (step S100). The line sensor camera 101 outputs the acquired line images to the arithmetic processing apparatus 200.

Next, when the data acquisition unit 201 of the arithmetic processing apparatus 200 acquires the line images input from the measurement apparatus 100, the data acquisition unit 201 of the arithmetic processing apparatus 200 arranges the input line image in the photographing order to generate a photographed image, and thereafter generates separated images by the separated-image generating unit 211 of the data processing unit 205 (S110). For example, as illustrated in FIG. 12, based on a photographed image, the separated-image generating unit 211 generates a first separated image composed of line images acquired at the lighting timing of only the first illumination light source 103, and a second separated image composed of line images acquired at the lighting timings of the first illumination light source 103 and the second illumination light source 105. The separated-image generating unit 211 then outputs the first separated image and second separated image generated to the mixing elimination processing unit 213.

The mixing elimination processing unit 213 performs a matrix operation with a separation matrix on the first separated image and the second separated image, to thereby remove the mixed component included in these separated images (S120). Specifically, the matrix operation is performed for the first separated image and the second separated image with the separation matrix P of the formula (2), to thereby generate the first mixing elimination image and the second mixing elimination image from which illumination components other than the reflection light of the illumination light of the illumination light source which should be originally included are removed. The mixing elimination processing unit 213 outputs the generated first mixing elimination image and second mixing elimination image to the difference-image generating unit 215.

The difference-image generating unit 215 generates a difference image based on the first mixing elimination image and the second mixing elimination image (S130). The difference-image generating unit 215 calculates the differences between luminance values of corresponding picture elements of the first mixing elimination image and the second mixing elimination image, and generates a difference image. The difference-image generating unit 215 outputs the generated difference image to the inclination calculation unit 217.

Note that, although in steps S110 to S130 the first separated image and the second separated image are generated based on the photographed image, and thereafter the mixing elimination processing is performed to generate the difference image, the present invention is not limited to this example. For example, as illustrated in FIG. 13, separated images may be generated without generating a photographed image. Alternatively, as illustrated in FIG. 14 and FIG. 15, a difference image may be generated without generating a photographed image, the first separated image and the second separated image, the first mixing elimination image and the second mixing elimination image. In addition, when generating a separated image, interpolation processing may be performed with respect to the original image of the separated image.

Returning to the description of FIG. 18, the inclination calculation unit 217 that receives the difference image as input calculates an inclination of the surface of the strip-shaped body S based on the difference image (S140). The inclination calculation unit 217 takes the difference image as luminance difference data that represents differences in luminance values, and calculates a direction and magnitude of an inclination of the surface of the strip-shaped body S based on a relationship between luminance differences and inclination of the surface of the strip-shaped body S that is acquired beforehand. The inclination calculation unit 217 then outputs data relating to the calculated inclination to the height calculation unit 219. At such time, the inclination calculation unit 217 may output data relating to the calculated inclination to the display control unit 207 as information for inspection.

Thereafter, the height calculation unit 219 integrates inclinations included in the data relating to inclinations output from the inclination calculation unit 217, to thereby calculate the height of the surface of the strip-shaped body S (S150). The height calculation unit 219 outputs the obtained data relating to the height of the surface of the strip-shaped body S to the display control unit 207 as information for inspection.

The display control unit 207 that receives the input of various kinds of information for inspection to be used for inspecting the surface of the strip-shaped body S may output the obtained results to a user or various kinds of devices that are provided externally. It is thereby possible for the user to ascertain inspection results relating to the shape of the strip-shaped body S.

[1-4. Summary]

The configuration of the shape inspection apparatus 10, and a shape inspection method for inspecting the strip-shaped body S using the shape inspection apparatus 10 according to the first embodiment of the present invention have been described above. According to the present embodiment, the first illumination light source 103 and the second illumination light source 105 are each arranged so as to be symmetric with respect to the optical axis of the line sensor camera 101 in the specular reflection direction at the surface of the strip-shaped body S of the optical axis of the line sensor camera 101. Then, the first illumination light source 103 is caused to always emit light, and the second illumination light source 105 is caused to emit light at a frequency that is one-half of the frequency of the scan rate of the line sensor camera 101, thereby acquiring a plurality of line images by the line sensor camera 101. Then, the arithmetic processing apparatus 200 removes illumination components other than the first illumination light source from the line image (the first line image) acquired at the lighting timing of only the first illumination light source 103, and removes illumination components other than the second illumination light source from the line image (the second line image) acquired at the lighting timings of the first illumination light source and the second illumination light source 105. Then, based on the difference between the first line image and the second line image subjected to the mixing elimination processing, the inclination of the surface of the strip-shaped body S is calculated.

According to the present embodiment, since the first illumination light source 103 and the second illumination light source 105 are arranged so that the respective optical axes are symmetric about the optical axis of the line sensor camera 101, with respect to the specular reflection direction at the surface of the strip-shaped body S of the optical axis of the line sensor camera 101, the radiation angle of illumination within a field of view and the visual angle of the surface become constant. Accordingly, it is possible to detect the surface shape of the strip-shaped body S with high accuracy by determining the difference between luminance values of these mixing elimination images. Also in a case where the mixing elimination processing is performed for each line image without generating separated images to generate a difference image, the difference between luminance values is determined between the first line image acquired at the lighting timing of only the first illumination light source 103, and the second line image acquired at the lighting timings of the first illumination light source 103 and the second illumination light source 105, which are adjacent in the order of photographing timing. Since this processing is similar to the case where separated images are generated, and thereafter the mixing elimination processing is performed to generate a difference image, the surface shape of the strip-shaped body S can be detected with high accuracy.

Further, in the present embodiment, since the first illumination light source 103 is caused to always emit light as illustrated in FIG. 11, both the first illumination light sources 103 and the second illumination light sources 105 may be emitting light. Therefore, even in a case where illumination lights are mixed, unevenness of the surface of the strip-shaped body S can be reliably detected, by generating the first mixing elimination image and the second mixing elimination image from which illumination components that should not be mixed to the first separated image and the second separated image are removed by the mixing elimination processing unit 213, and thereafter generating a difference image based on the first mixing elimination image and the second mixing elimination image.

Further, in the present embodiment, as illustrated in FIG. 11, the lighting pattern of single lighting is adopted that causes the first illumination light source 103 to always emit light, and causes the second illumination light source 105 to blink. In the lighting pattern of single lighting, since light control may be performed only on one illumination light source, there is an effect that the power supply cost due to the usage of an expensive blinking device to cause an illumination light source to blink can be reduced by half. Note that the lighting pattern of the first illumination light source 103 and the second illumination light source 105 is not limited to the example illustrated in FIG. 11, and may be other lighting patterns.

Generally, in a case where it is assumed that the intensity of the first illumination light source 103 at the photographing timing of an odd-numbered line is 1, in a case where the intensity of the second illumination light source 105 at the photographing timing of an odd-numbered line is $\alpha$, the intensity of the first illumination light source 103 at the photographing timing of an even-numbered line is $\beta$, and the intensity of the second illumination light source 105 at the same timing is $\gamma$, the mixing elimination matrix will be a formula (3).

[Expression 2]

$$P = \begin{bmatrix} 1 & \alpha \\ \beta & \gamma \end{bmatrix}^{-1} \tag{3}$$

In order for an inverse matrix to exist in the formula (3), the rows may be linearly independent. That is, at the photographing timing of an odd-numbered line, and the photographing timing of an even-numbered line, the intensity ratios 1:$\alpha$ and $\beta$:$\gamma$ may be different from each other.

Figure 19:
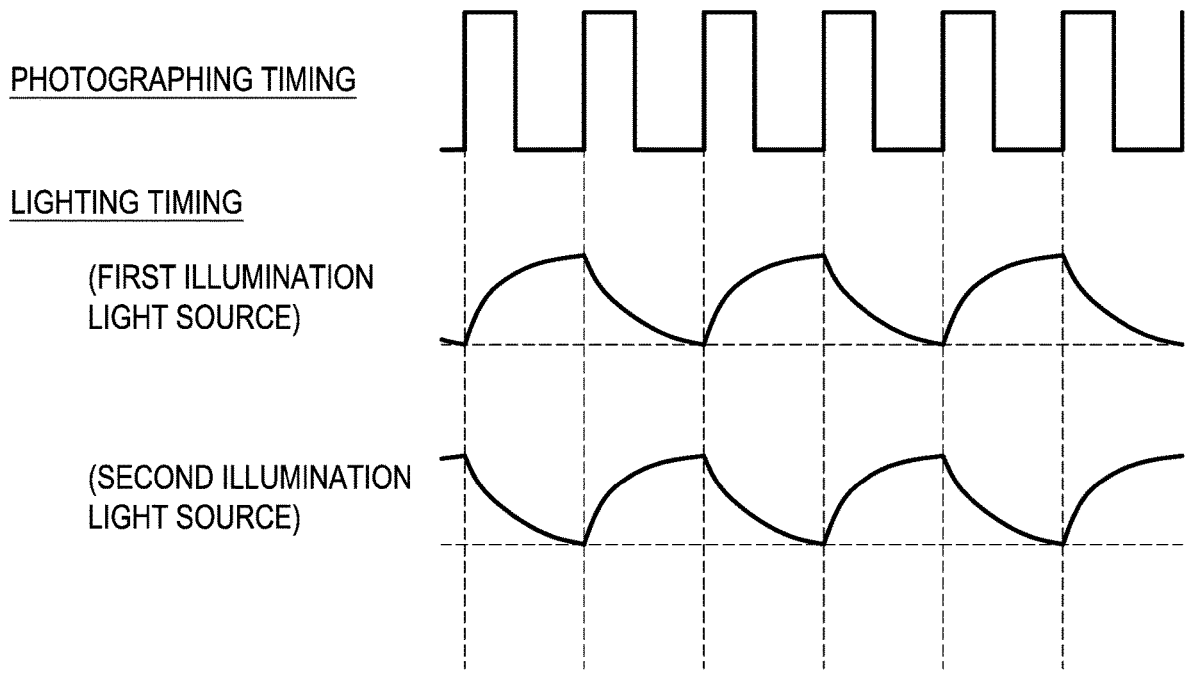
FIG. 19 is an explanatory diagram illustrating another lighting pattern of a first lighting apparatus and a second lighting apparatus.

Further, in the present embodiment, for example, the first illumination light source 103 and the second illumination light source 105 may be caused to emit light with waveforms as illustrated in FIG. 19. For example, it is practically difficult to make the luminescence intensity into a perfect square wave as the lighting timing of the second illumination light source 105 illustrated in FIG. 11, and even if square wave driving of a power supply is performed, the luminescence intensity of an illumination light source will be a rounded waveform as illustrated in FIG. 19. As shown in FIG. 19, in a case where the first illumination light source 103 and the second illumination light source 105 are each caused to emit light at a timing shifted by a half wavelength, by modulating the luminescence intensity with a frequency one-half of the frequency of the scan rate of the line sensor camera 101, when the surface of the strip-shaped body S is photographed by the line sensor camera 101, photographing will be performed in a state where the reflection lights of two illumination lights are mixed. Therefore, even in a case where illumination lights are mixed, unevenness of the surface of the strip-shaped body S can be reliably detected, by generating the first mixing elimination image and the second mixing elimination image from which illumination components that should not be mixed to the first separated image and the second separated image are removed by the mixing elimination processing unit 213, and thereafter generating a difference image based on the first mixing elimination image and the second mixing elimination image.

Figure 20:
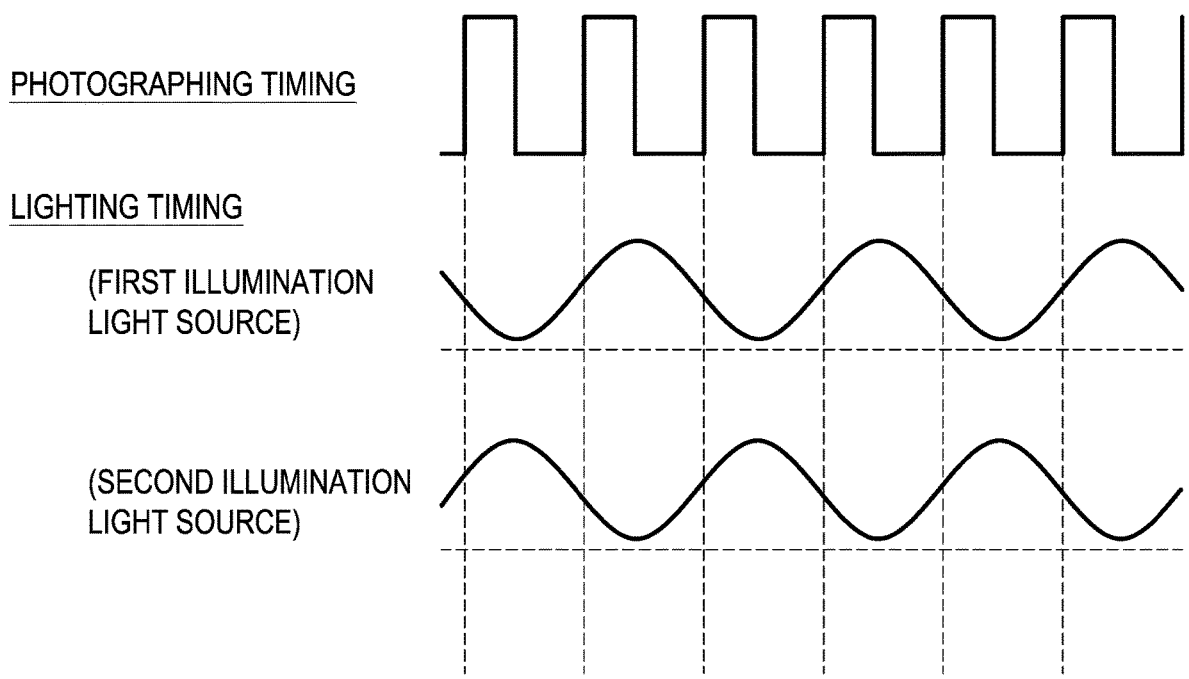
FIG. 20 is an explanatory diagram illustrating another lighting pattern of the first lighting apparatus and the second lighting apparatus.

Further, also in a case where the first illumination light source 103 and the second illumination light source 105 are each modulated with the luminescence intensity represented by a sine wave having a frequency that is one-half of the frequency of the scan rate of the line sensor camera 101 as illustrated in FIG. 20, similarly, even in a case where illumination lights are mixed, unevenness of the surface of the strip-shaped body S can be reliably detected, by generating a difference image based on the first mixing elimination image and the second mixing elimination image.

In order to prevent lighting of the first illumination light source 103 and lighting of the second illumination light source 105 from overlapping with each other in the line sensor camera 101, it is necessary to cause each of the illumination light sources 103 and 105 to blink at tens of kHz, and a great electromagnetic noise may be emitted to the surroundings in square wave driving. Therefore, there may be a concern that other measuring equipment installed around the shape inspection apparatus may be affected. Further, the rod-like first illumination light source 103 and second illumination light source 105 are large-sized, and fast switching is difficult due to wiring inductance. Also from this reason, unevenness of the surface of the strip-shaped body S can be reliably detected, by making it possible to remove the mixing of illumination light sources as in the present embodiment. Especially, since it is difficult to completely avoid the mixing of illumination light sources in a case where a high-speed line sensor camera is used, the technique according to the present embodiment is effective.

2. Second Embodiment

Figure 21:
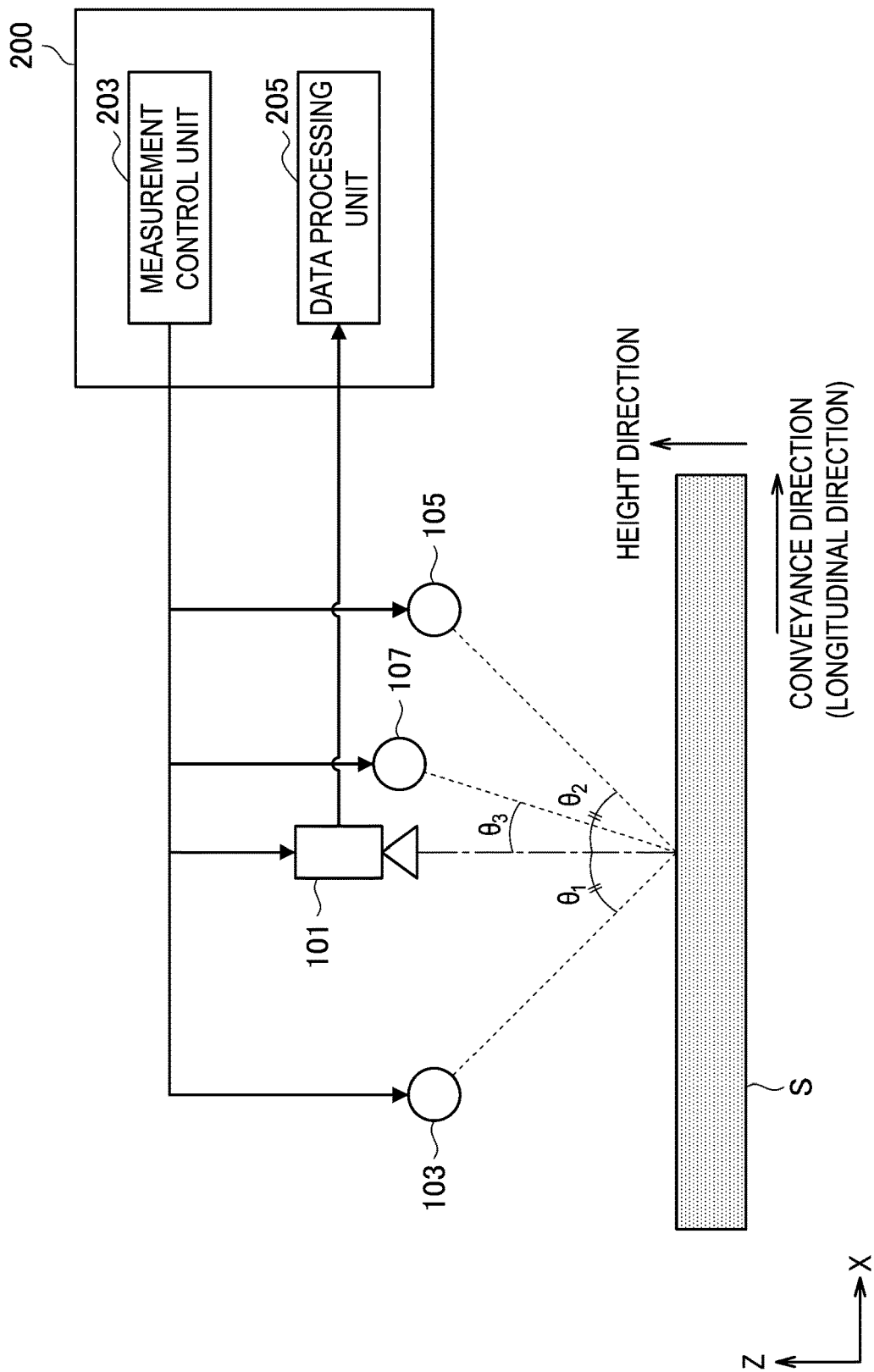
FIG. 21 is an explanatory diagram that schematically illustrates one configuration example of a measurement apparatus constituting part of a shape inspection apparatus according to a second embodiment of the present invention, and shows a state in which a strip-shaped body is viewed from a side face.
Figure 22:
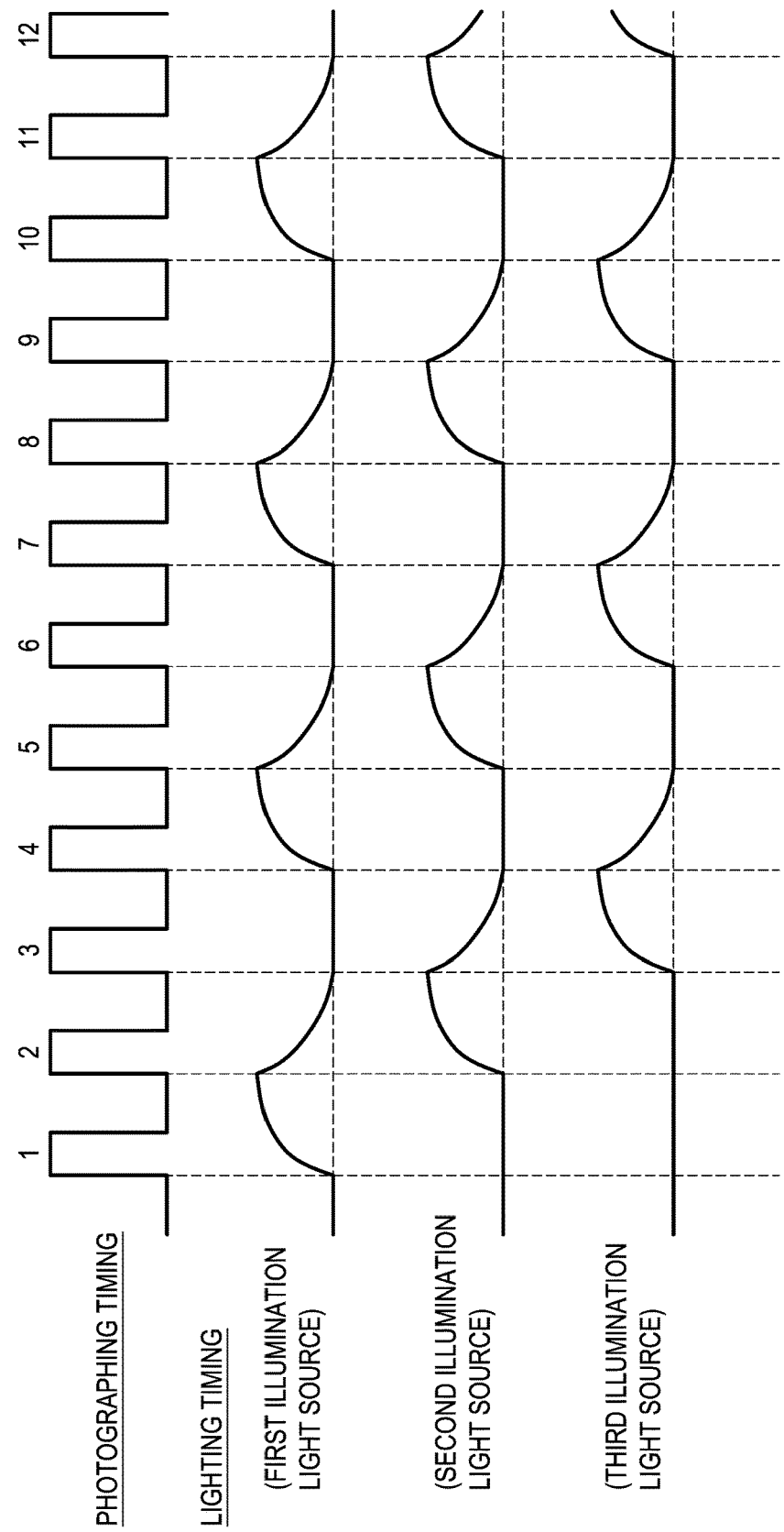
FIG. 22 is a timing chart illustrating an example of the photographing timing of the line sensor camera, and the lighting timings of the first illumination light source, the second illumination light source, and a third illumination light source according to the second embodiment.
Figure 23:
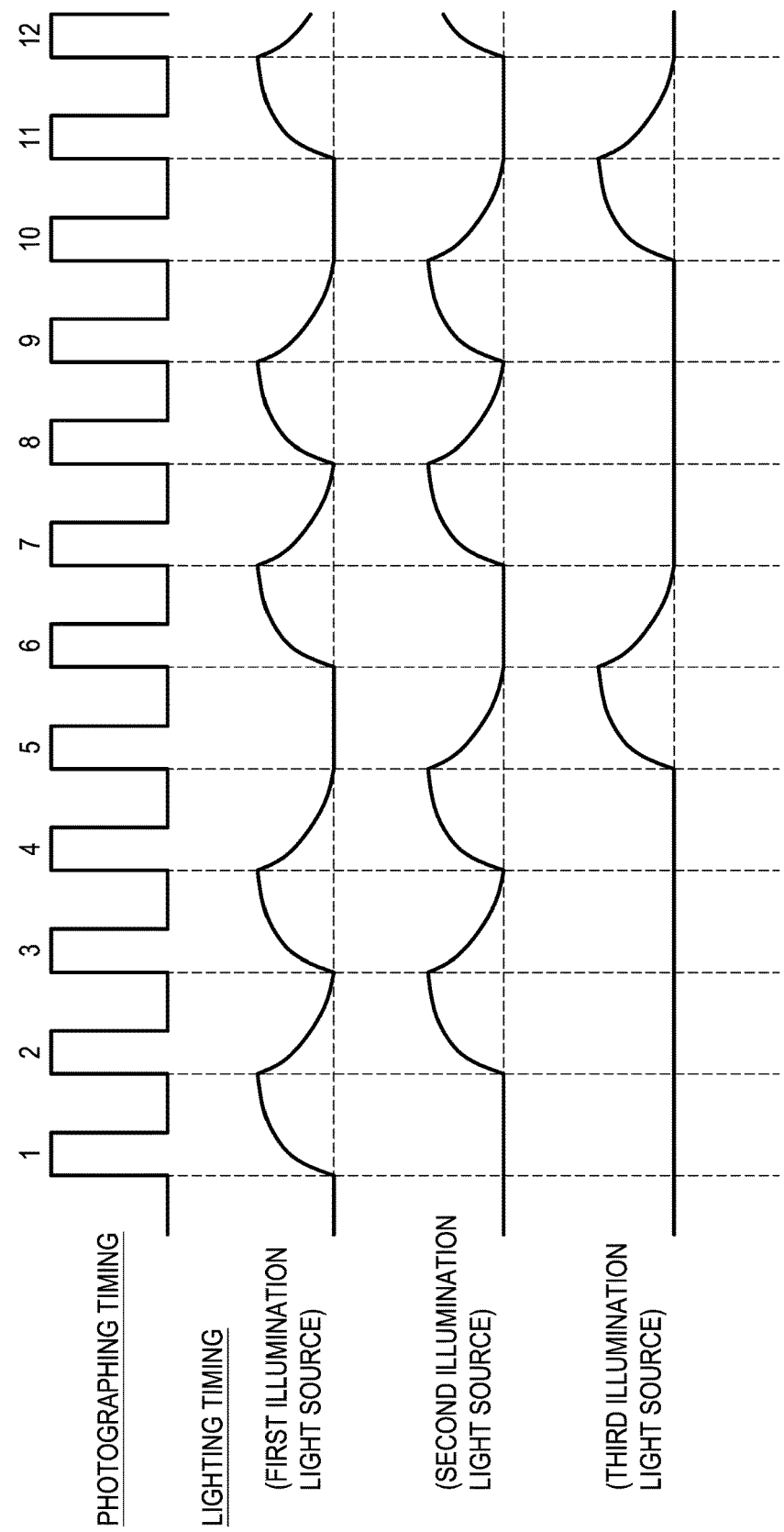
FIG. 23 is a timing chart illustrating an example of the lighting timings of the first illumination light source, the second illumination light source, and the third illumination light source in a case where mixing of illumination lights cannot be eliminated by mixing elimination processing according to the second embodiment.

Next, the configuration and actions of a shape inspection apparatus according to a second embodiment of the present invention will be described based on FIG. 21 to FIG. 23. FIG. 21 is an explanatory diagram that schematically illustrates one configuration example of a measurement apparatus constituting part of the shape inspection apparatus according to the present embodiment, and shows a state in which a strip-shaped body S is viewed from a side face. FIG. 22 is a timing chart illustrating an example of the photographing timing of the line sensor camera 101, and the lighting timings of the first illumination light source 103, the second illumination light source 105, and the third illumination light source 107 according to the present embodiment. FIG. 23 is a timing chart illustrating an example of the lighting timings of the first illumination light source 103, the second illumination light source 105, and the third illumination light source 107 in a case where the mixing of illumination lights cannot be eliminated by the mixing elimination processing according to the present embodiment.

The shape inspection apparatus according to the present embodiment differs from the first embodiment in that the number of illumination light sources in the measurement apparatus 100 is increased compared to the first embodiment. By increasing the number of illumination light sources, it is possible to ascertain not only an inclination of the surface of the strip-shaped body S that is detected in the first embodiment, but also, for example, to ascertain the surface property of the strip-shaped body S such as dirt such as rust or a striped pattern.

As illustrated in FIG. 21, the measurement apparatus 100 of the shape inspection apparatus 10 according to the present embodiment includes the line sensor camera 101, the first illumination light source 103, the second illumination light source 105 and a supplementary illumination light source 107 as the third illumination light source. The line sensor camera 101, the first illumination light source 103, the second illumination light source 105 and the supplementary illumination light source 107 are fixed by known means so that their setting positions do not change. Note that, since the configuration of the line sensor camera 101, the first illumination light source 103 and the second illumination light source 105 are the same as the contents described based on FIG. 5 and FIG. 6, a description thereof will be omitted here.

Similarly to the first illumination light source 103 and the second illumination light source 105, the supplementary illumination light source 107 radiates strip-shaped illumination light (hereinafter, also referred to as "supplementary illumination light") onto the surface of the strip-shaped body S. Although the first illumination light source 103 and the second illumination light source 105 are used to calculate an inclination of the surface of the strip-shaped body S and detect unevenness on the surface of the strip-shaped body S, the supplementary illumination light source 107 is used to detect dirt such as rust or a striped pattern or the like. Therefore, the color of the supplementary illumination light of the supplementary illumination light source 107 need not be the same as the color of the first illumination light and second illumination light, and can be selected according to the color of the detection object that it is desired to detect using the supplementary illumination light source 107.

Further, similarly to the first illumination light source 103 and the second illumination light source 105, the supplementary illumination light source 107 may be, for example, a rod-like LED light, or may be a light having a configuration in which a laser beam is expanded by a rod lens or the like into a linear shape. Further, as a visible-light source utilized for the first illumination light source 103 and the second illumination light source 105, a light source that uses a single-wavelength laser beam or an LED may be used, or a light source with a continuous spectrum may be used.

The supplementary illumination light source 107 is arranged at a position different from the first illumination light source 103 and the second illumination light source 105. For example, as illustrated in FIG. 21, the angle (third angle: $\theta_3$) formed by the optical axis of the supplementary illumination light source 107 and the optical axis of the line sensor camera 101 is different from the first angle $\theta_1$ formed by the optical axis of the first illumination light source 103 and the optical axis of the line sensor camera 101, and the second angle $\theta_2$ formed by the optical axis of the second illumination light source 105 and the optical axis of the line sensor camera 101. The third angle $\theta_3$ is set according to the detection object to be detected using the supplementary illumination light source 107, and may be set to a smaller angle than the first angle $\theta_1$ and the second angle $\theta_2$ as illustrated in FIG. 21, or may be set to a larger angle than the first angle $\theta_1$ and the second angle $\theta_2$.

For example, as illustrated in FIG. 19, the first illumination light source 103, the second illumination light source 105, and the supplementary illumination light source 107 are caused to sequentially emit light with different intensity ratios (patterns) based on control information from the measurement control unit 203 of the arithmetic processing apparatus 200. The line sensor camera 101 photographs the surface of the strip-shaped body S with respective lighting patterns of the first illumination intensity ratio (the first lighting pattern), the second illumination intensity ratio (the second lighting pattern), and the third illumination intensity ratio (the third lighting pattern). Accordingly, a line image acquired with the line sensor camera 101 is an image in which the first line image acquired at the first lighting pattern, the second line image acquired at the second lighting pattern, and the third line image acquired at the third lighting pattern are arranged in the longitudinal direction in accordance with the lighting order of the illumination light sources.

Based on the line image acquired in this way, in a similar manner to the first embodiment, at the data processing unit 205, the arithmetic processing apparatus 200 generates the first separated image, the second separated image, and a supplementary separated image that are composed of the line images acquired when the illumination light sources 103, 105 and 107 are caused to emit light, respectively. Then, as for the first separated image, the second separated image, and the supplementary separated image, an unnecessary illumination component is removed from each of the separated images by the mixing elimination processing unit 213. Here, in a case where the number N of the illumination light sources is three or more, for example, as illustrated in FIG. 22, it is necessary to cause the respective illumination light sources to emit light by sequentially repeating different N patterns of illumination intensity ratios, at a frequency that is 1/N of the frequency of the scan rate of the line sensor camera 101. This is because, in order to separate the mixed component of illumination lights by the matrix operation with the single separation matrix P, it is necessary for the illumination intensity ratios of N separated images to be always constant.

For example, as illustrated in FIG. 23, assume that the lighting cycle of the supplementary illumination light source 107, which is the third illumination light source, is set longer than the lighting cycles of the first illumination light source 103 and the second illumination light source 105. In this case, for example, a third frame and an eighth frame of the frames photographed by the line sensor camera 101 mainly include the illumination component of the first illumination light source 103, to which the illumination light of the second illumination light source 105 is mixed. However, for example, a sixth frame and an 11th frame mainly include the illumination component of the first illumination light source 103, to which the illumination light of the supplementary illumination light source 107 is mixed. Thus, the illumination light mixed to the first separated image is different depending on a frame, and separation cannot be performed with a single matrix. Accordingly, in a case where three or more illumination light sources are used, when the mixed illumination lights are to be separated with a single matrix, for example, as illustrated in FIG. 22, it is necessary that the first illumination light source 103, the second illumination light source 105, and the supplementary illumination light source 107 are sequentially caused to emit light at an identical cycle, so that the mixed illumination lights always become constant.

Note that, although in the above description a photographed image, separated images, and mixing elimination images are generated based on line images acquired by the line sensor camera 101 at the respective lighting timings of the first illumination light source 103, the second illumination light source 105, and the supplementary illumination light source 107, to thereby acquire a difference image, the present invention is not limited to this example. Similarly to the first embodiment, when detecting unevenness of the surface of the strip-shaped body S, for example, as illustrated in FIG. 13, separated images may be generated without generating a photographed image. Alternatively, as illustrated in FIG. 14 and FIG. 15, a difference image may be generated without generating a photographed image, the first separated image and the second separated image, and the first mixing elimination image and the second mixing elimination images. In addition, when generating a separated image, interpolation processing may be performed with respect to the original image of the separated image.

Further, in a case where three or more illumination light sources are used, mixing between images can be eliminated by performing the following matrix operation with respect to separated images generated by the separated-image generating unit 211. That is, even in a case where lighting of a plurality of illumination light sources is overlapped, it is possible to prevent a problem due to mixing. Specifically, at the time of an i-th illumination intensity ratio, i.e., at the timing of photographing an i-th separated image, assuming that the intensity of a j-th illumination is the separation matrix P for separating the mixed illumination components is represented by the following formula (4).

[Expression 3]

$$P = \begin{bmatrix} I_{11} & \cdots & I_{1N} \\ \vdots & & \vdots \\ I_{N1} & \cdots & I_{NN} \end{bmatrix}^{-1} \quad (4)$$

The mixing elimination processing unit 213 performs a matrix operation on each of the first separated image, the second separated image, and the supplementary separated image with the separation matrix P, to thereby acquire the first mixing elimination image from which the other illumination components have been removed from the first separated images, the second mixing elimination image from which the other illumination components have been removed from the second separated image, and a mixing elimination supplementary image from which the other illumination components have been removed from the supplementary separated image. Specifically, as in the following formula (5), mixing elimination images $T_i(x, y)$ are generated by multiplying the identical position of N sheets of separated images $S_i(x, y)$ with the separation matrix P. Upon generating the first mixing elimination image, the second mixing elimination image, and a mixing elimination supplementary image, the mixing elimination processing unit 213 outputs the first mixing elimination image, the second mixing elimination image, and the mixing elimination supplementary image to the difference-image generating unit 215.

[Expression 4]

$$\begin{bmatrix} T_1(x, y) \\ \vdots \\ T_N(x, y) \end{bmatrix} = P \begin{bmatrix} S_1(x, y) \\ \vdots \\ S_N(x, y) \end{bmatrix} \quad (5)$$

Similarly to the first embodiment, the difference-image generating unit 215 generates a difference image based on the first mixing elimination image and the second mixing elimination image. Specifically, a difference image D (x, y) is generated from the following formula (6).

[Expression 5]

$$D(x,y)=T_1(x,y)-T_2(x,y) \tag{6}$$

Thereafter, the inclination and height of the surface of the strip-shaped body S are obtained by the inclination calculation unit 217 and the height calculation unit 219. On the other hand, for example, contamination such as rust, and a detection object such as a pattern are detected by using only the mixing elimination supplementary image, or by comparison with the first mixing elimination image or the second mixing elimination image, based on the mixing elimination supplementary image composed of line images photographed when the supplementary illumination light source 107 is caused to emit light.

By installing a plurality of illumination light sources, and while sequentially causing the illumination light sources to emit light, photographing the surface of the strip-shaped body S at the respective lighting timings by means of the line sensor camera 101 in this way, the surface shape of the surface of the strip-shaped body S can be ascertained in more detail.

Note that although only one supplementary illumination light source is provided in the example in FIG. 21, the present invention is not limited to this example, and a plurality of supplementary illumination light sources may be provided. Providing a plurality of supplementary illumination light sources enables the surface shape of the strip-shaped body S to be ascertained in greater detail since the surface shape that is detectable can be increased.

3. Hardware Configuration Example

Figure 24:
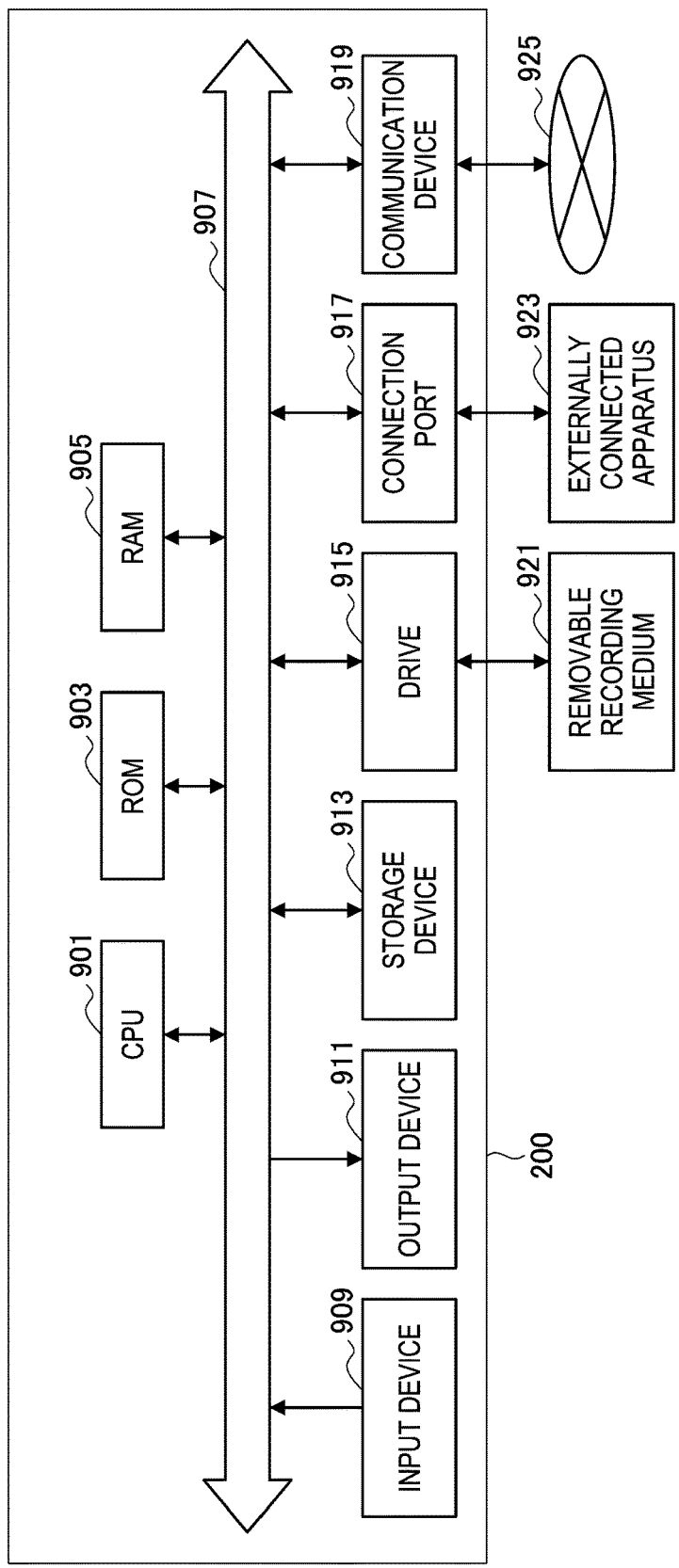
FIG. 24 is a block diagram illustrating a hardware configuration of an arithmetic processing apparatus according to the respective embodiments of the present invention.

The hardware configuration of the arithmetic processing apparatus 200 according to the above embodiments of the present invention will now be described in detail referring to FIG. 24. FIG. 24 is a block diagram illustrating the hardware configuration of the arithmetic processing apparatus 200 according to the respective embodiments of the present invention.

The arithmetic processing apparatus 200 mainly includes a CPU 901, a ROM 903, and a RAM 905. The arithmetic processing apparatus 200 also includes a bus 907, an input device 909, an output device 911, a storage device 913, a drive 915, a connection port 917, and a communication device 919.

The CPU 901 functions as an arithmetic processing apparatus and a control device, and controls the all or a part of the operations of the arithmetic processing apparatus 200 according to various programs recorded in the ROM 903, the RAM 905, the storage device 913, or a removable recording medium 921. The ROM 903 stores programs, operation parameters and the like used by the CPU 901. The RAM 905 primarily stores programs that the CPU 901 uses and parameters and the like that vary as appropriate during the execution of the programs. These components are connected with each other via the bus 907 that is constituted by an internal bus such as a CPU bus.

The bus 907 is connected to an external bus such as a PCI (Peripheral Component Interconnect/Interface) bus via a bridge.

The input device 909 is operation means that is operated by a user, such as, for example, a mouse, a keyboard, a touch panel, buttons, a switch and a lever. The input device 909 may be remote control means (a so-called "remote control") that utilizes, for example, infrared light or other radio waves, or may be an externally connected apparatus 923 such as a PDA conforming to the operation of the arithmetic processing apparatus 200. Furthermore, the input device 909 generates an input signal based on, for example, information which is input by a user with the above operation means, and is constituted by an input control circuit for outputting the input signal to the CPU 901. The user can input various data to the shape inspection apparatus 10 and can instruct the shape inspection apparatus 10 to perform processing by operating the input device 909.

The output device 911 is constituted by a device capable of visually or audibly notifying acquired information to a user. Examples of such a device include display devices such as a CRT display device, a liquid crystal display device, a plasma display device, an EL display device and lamps, audio output devices such as a speaker and a headphone, a printer, a mobile phone, and a facsimile machine. For example, the output device 911 outputs a result obtained by various kinds of processing performed by the arithmetic processing apparatus 200. More specifically, the display device displays, in the form of text or an image, a result obtained by various kinds of processing performed by the arithmetic processing apparatus 200. On the other hand, the audio output device converts an audio signal such as reproduced audio data or sound data into an analog signal, and outputs the analog signal.

The storage device 913 is a device used for storing data that is configured as an example of a storage unit of the arithmetic processing apparatus 200. The storage device 913 is constituted by, for example, a magnetic storage device such as an HDD (Hard Disk Drive), a semiconductor storage device, an optical storage device or a magneto-optical storage device. The storage device 913 stores programs to be executed by the CPU 901, various data, and various data obtained from the outside and the like.

The drive 915 is a reader/writer for recording media, and is built into the arithmetic processing apparatus 200 or attached externally thereto. The drive 915 reads information recorded on a mounted removable recording medium 921 such as a magnetic disk, an optical disk, a magneto-optical disk or a semiconductor memory, and outputs the read information to the RAM 905. Furthermore, the drive 915 can write to the mounted removable recording medium 921 such as a magnetic disk, an optical disk, a magneto-optical disk or a semiconductor memory. The removable recording medium 921 is, for example, a CD medium, a DVD medium, or a Blu-ray (registered trademark) medium. Further, the removable recording medium 921 may be a CompactFlash (CF; registered trademark), a flash memory, an SD memory card (Secure Digital Memory Card) or the like. The removable recording medium 921 may also be, for example, an IC card (Integrated Circuit Card) equipped with a non-contact IC chip, or an electronic device.

The connection port 917 is a port for directly connecting devices to the arithmetic processing apparatus 200. Examples of the connection port 917 include a USB (Universal Serial Bus) port, an IEEE1394 port, an SCSI (Small Computer System Interface) port and an RS-232C port. By connecting the externally connected apparatus 923 to the connection port 917, the arithmetic processing apparatus 200 directly acquires various data from the externally connected apparatus 923 and provides various data to the externally connected apparatus 923.

The communication device 919 is a communication interface constituted by, for example, a communication device for connecting to a communication network 925. The communication device 919 is, for example, a wired or wireless LAN (Local Area Network), Bluetooth (registered trademark), a communication card for WUSB (Wireless USB), or the like. Further, the communication device 919 may be a router for optical communication, a router for ADSL (Asymmetric Digital Subscriber Line), a modem for various kinds of communication, or the like. The communication device 919, for example, can transmit and receive signals and the like in accordance with a predetermined protocol such as TCP/IP on the Internet or to and from other communication devices. The communication network 925 that is connected to the communication device 919 is constituted by a network or the like which is connected via wire or wirelessly, and may be, for example, the Internet, a home LAN, infrared communication, radio wave communication, satellite communication or the like.

An example of a hardware configuration that is capable of realizing the functions of the arithmetic processing apparatus 200 according to the embodiments of the present invention has been described above. Each of the constituent elements described above may be constituted using general-purpose members, or may be constituted by hardware dedicated to the function of each constituent element. Accordingly, the hardware configuration to be used can be changed as appropriate according to the technical level at the time of carrying out the present embodiment.

EXAMPLES

Hereunder, the shape inspection apparatus according to the aforementioned embodiments of the present invention is described while showing specific examples. The examples described hereunder are merely an example of a shape inspection apparatus and a shape inspection method according to the present invention, and the shape inspection apparatus and shape inspection method according to the present invention are not limited to the examples described below.

In the present examples, detection of the surface shape of a steel plate was performed using a shape inspection apparatus having a configuration based on the first embodiment, and taking as detection targets a concave portion with a diameter of approximately 2 mm formed artificially in the surface of the steel plate, and a rust region at which rust has arisen at the surface of a steel plate. A line sensor camera was installed so that the optical axis thereof was perpendicular to the surface of the steel plate. A first illumination light source and a second illumination light source were installed at positions at an angle of 45° with respect to the optical axis of the line sensor camera, respectively, so as to be symmetric with respect to the optical axis of the line sensor camera.

As illustrated in FIG. 11, the lighting timings of the first illumination light source and the second illumination light source were such that the first illumination light source was caused to always emit light, and only the second illumination light source was caused to blink. At this time, the separated image P for separating the illumination component of the other illumination light from the first separated image and the second separated image was as the following formula (7).

[Expression 6]

$$P = \begin{bmatrix} 1 & 0 \\ -1 & 1 \end{bmatrix} \quad (7)$$

Figure 25:
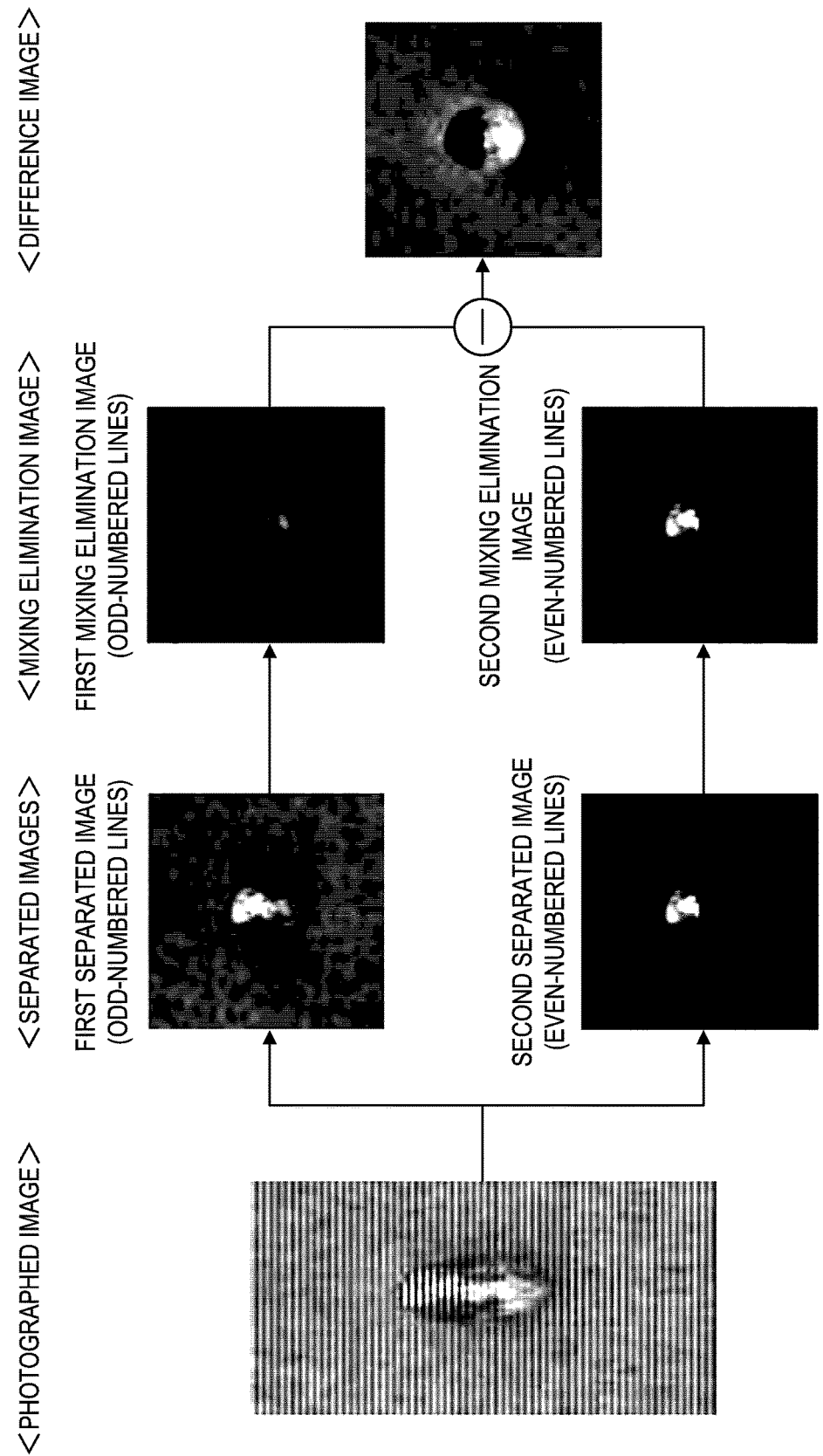
FIG. 25 illustrates separated images, mixing elimination images, and a difference image in a case where a photographed image of a concave portion is acquired by the line sensor camera as an example.
Figure 26:
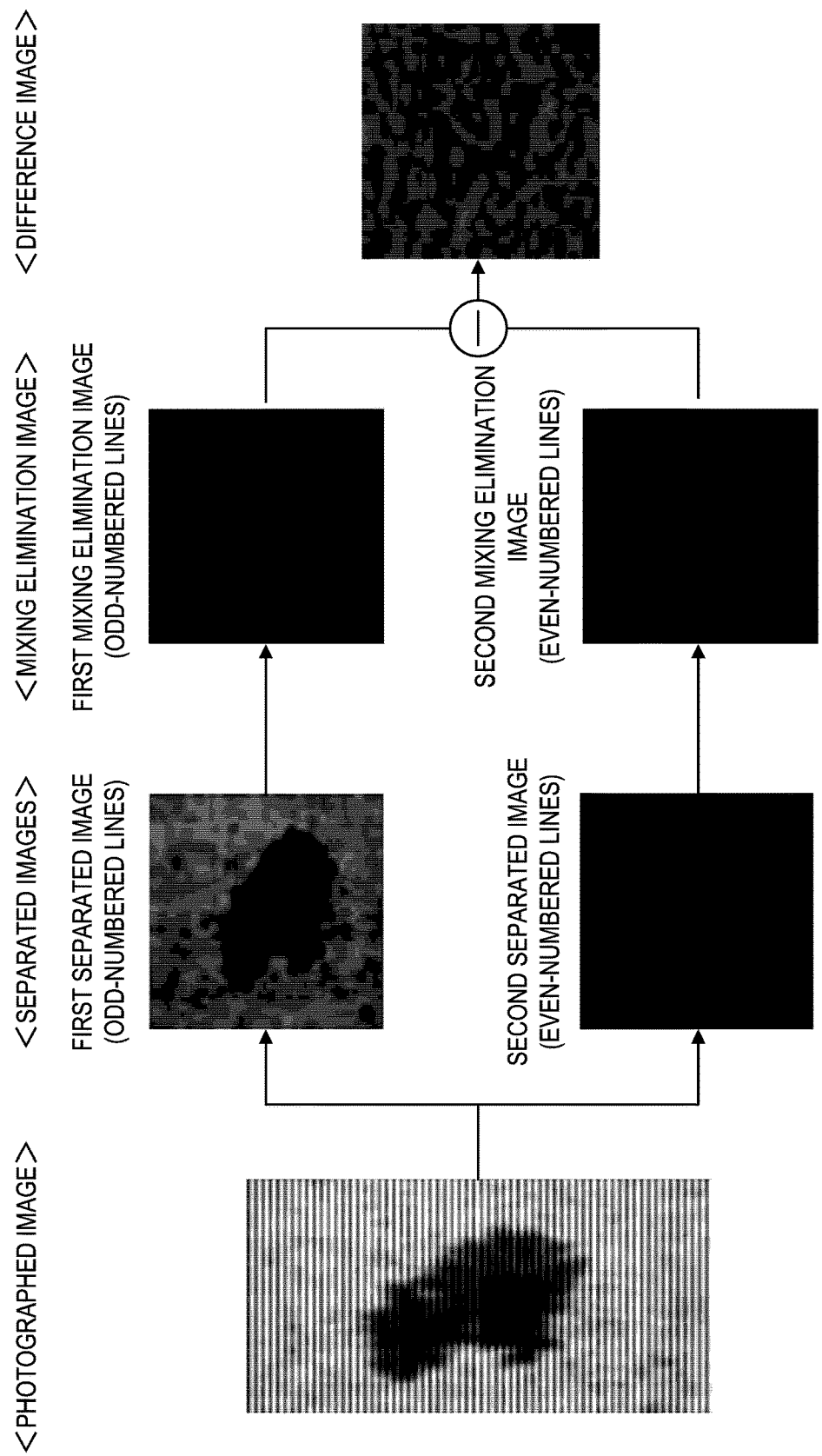
FIG. 26 illustrates separated images, mixing elimination images, and a difference image in a case where a photographed image of a rust region is acquired by the line sensor camera as an example.

FIG. 25 illustrates separated images, mixing elimination images, and a difference image in a case where a photographed image of a concave portion was acquired by the line sensor camera, and FIG. 26 illustrates separated images, mixing elimination images, and a difference image in a case where a photographed image of a rust region was acquired by the line sensor camera. As for the photographed image of the concave portion, as illustrated in FIG. 25, although it is also possible to ascertain the shape of the concave portion from the first separated image and the second separated image, it was possible to clearly ascertain the shape of the concave portion by generating the mixing elimination images, and determining the difference therebetween. Further, as for the photographed image of the rust region, as illustrated in FIG. 26, although its pattern appeared in the first separated image and the second separated image, the rust region did not appear in the difference image by generating the mixing elimination images, and determining the difference therebetween. It has thus been found that a surface shape having an inclination and height in a flat surface can be accurately detected by means of the shape inspection apparatus of the present invention.

Whilst preferred embodiments of the present invention have been described in detail above with reference to the accompanying drawings, the present invention is not limited to the above examples. It is clear that a person having common knowledge in the field of the art to which the present invention pertains will be able to contrive various examples of changes and modifications within the category of the technical idea described in the appended claims, and it should be understood that they also naturally belong to the technical scope of the present invention.

REFERENCE SIGNS LIST

10 Shape inspection apparatus
100 Measurement apparatus
101 Line sensor camera
103 First illumination light source
105 Second illumination light source
107 Supplementary illumination light source
200 Arithmetic processing apparatus
201 Data acquisition unit
203 Measurement control unit
205 Data processing unit
207 Display control unit
209 Storage unit
211 Separated-image generating unit
213 Mixing elimination processing unit
215 Difference-image generating unit
217 Inclination calculation unit
219 Height calculation unit
S Strip-shaped body

The invention claimed is:
1. A shape inspection apparatus for detecting a surface shape of a strip-shaped body, comprising:
N illumination light sources each configured to radiate strip-shaped illumination light to the strip-shaped body, N being an integer greater than 1;

a line sensor camera configured to photograph a surface of the strip-shaped body; and
a processor configured to:
control a lighting timing of each of the illumination light sources and a photographing timing of the line sensor camera; and
process a plurality of line images acquired by the line sensor camera, and to calculate an inclination of the surface of the strip-shaped body,
wherein:
the N illumination light sources include at least a first illumination light source and a second illumination light source,
the first illumination light source and the second illumination light source are arranged so that respective optical axes are symmetric about a specular reflection direction at the surface of the strip-shaped body of an optical axis of the line sensor camera,
the processor controls the N illumination light sources to modulate luminescence intensities at a frequency that is 1/N of a frequency of a scan rate of the line sensor camera, and to emit light from each of the N illumination light sources according to N different lighting patterns by sequentially repeating N different lighting patterns of illumination intensity ratios, including at least a pattern in which lighting of at least a plurality of the illumination light sources is overlapped, and
the processor calculates an inclination of the surface of the strip-shaped body based on a first line image acquired with a first pattern in which the first illumination light source emits light, and a second line image acquired with a second pattern in which the second illumination light source emits light.

2. The shape inspection apparatus according to claim 1, wherein the processor
calculates the inclination of the surface of the strip-shaped body based on a difference between a first mixing elimination image acquired by removing an illumination component other than the first illumination light source from the first line image, and a second mixing elimination image acquired by removing an illumination component other than the second illumination light source from the second line image.

3. The shape inspection apparatus according to claim 1, wherein the processor causes the first illumination light source to always emit light.

4. The shape inspection apparatus according to claim 1, wherein modulation waveforms of the luminescence intensities of the illumination light sources are square waves.

5. The shape inspection apparatus according to claim 1, wherein modulation waveforms of the luminescence intensities of the illumination light sources are sine waves.

6. The shape inspection apparatus according to claim 1, wherein:
a difference between an angle formed by the optical axis of the first illumination light source and the specular reflection direction at the surface of the strip-shaped body of the optical axis of the line sensor camera, and an angle formed by the optical axis of the second illumination light source and the specular reflection direction at the surface of the strip-shaped body of the optical axis of the line sensor camera is 5° or less, and
an angle formed by each of the optical axes of the first illumination light source and the second illumination light source and the specular reflection direction at the surface of the strip-shaped body of the optical axis of the line sensor camera is 30° or more.

7. The shape inspection apparatus according to claim 1, wherein the processor calculates a height of the surface of the strip-shaped body by integrating the inclination of the surface of the strip-shaped body in a longitudinal direction.

8. The shape inspection apparatus according to claim 1, wherein:
among the N illumination light sources, the illumination light sources other than the first illumination light source and the second illumination light source are supplementary illumination light sources, and
the processor
removes an illumination component other than the supplementary illumination light source from a third line image acquired at the lighting timing of the supplementary illumination light source, and
identifies a surface state of the strip-shaped body based on the third line image from which the illumination component other than the supplementary illumination light source has been removed.

9. A shape inspection method for detecting a surface shape of a strip-shaped body, comprising:
a radiating step of using N illumination light sources to radiate respective strip-shaped illumination lights to the strip-shaped body, N being an integer greater than 1;
a photographing step of photographing a surface of the strip-shaped body using a line sensor camera;
a measurement control step of controlling lighting timings of the illumination light sources, and a photographing timing of the line sensor camera; and
a data processing step of processing a line image acquired by the line sensor camera, and calculating an inclination of the surface of the strip-shaped body,
wherein:
the N illumination light sources include at least a first illumination light source and a second illumination light source,
the first illumination light source and the second illumination light source are arranged so that respective optical axes are symmetric about a specular reflection direction at the surface of the strip-shaped body of an optical axis of the line sensor camera,
the measurement control step includes controlling the N illumination light sources to modulate luminescence intensities at a frequency that is 1/N of a frequency of a scan rate of the line sensor camera, and to emit light from each of the N illumination light sources according to N different lighting patterns by sequentially repeating N different lighting patterns of illumination intensity ratios, including at least a pattern in which lighting of at least a plurality of the illumination light sources is overlapped, and
the data processing step includes calculating an inclination of the surface of the strip-shaped body based on a first line image acquired with a first pattern in which the first illumination light source emits light, and a second line image acquired with a second pattern in which the second illumination light source emits light.

10. The shape inspection method according to claim 9, wherein:
the data processing step
calculates the inclination of the surface of the strip-shaped body based on a difference between a first mixing elimination image acquired by removing an illumination component other than the first illumination light source from the first line image, and a second mixing elimination image acquired by removing an illumination component other than the second illumination light source from the second line image.

11. The shape inspection method according to claim 9, wherein the first illumination light source is caused to always emit light.

12. The shape inspection method according to claim 9, wherein modulation waveforms of the luminescence intensities of the illumination light sources are square waves.

13. The shape inspection method according to claim 9, wherein modulation waveforms of the luminescence intensities of the illumination light sources are sine waves.

14. The shape inspection method according to claim 9, wherein:
 a difference between an angle formed by the optical axis of the first illumination light source and the specular reflection direction at the surface of the strip-shaped body of the optical axis of the line sensor camera, and an angle formed by the optical axis of the second illumination light source and the specular reflection direction at the surface of the strip-shaped body of the optical axis of the line sensor camera is 5° or less, and
 an angle formed by each of the optical axes of the first illumination light source and the second illumination light source and the specular reflection direction at the surface of the strip-shaped body of the optical axis of the line sensor camera is 30° or more.

15. The shape inspection method according to claim 9, wherein the data processing step includes calculating a height of the surface of the strip-shaped body by integrating the inclination of the surface of the strip-shaped body in a longitudinal direction.

16. The shape inspection method according to claim 9, wherein:
 among the N illumination light sources, the illumination light sources other than the first illumination light source and the second illumination light source are supplementary illumination light sources, and
 an illumination component other than the supplementary illumination light source is removed from a third line image acquired at the lighting timing of the supplementary illumination light source, and
 a surface state of the strip-shaped body is identified based on the third line image from which the illumination component other than the supplementary illumination light source has been removed.

* * * * *